(12) United States Patent
Rive et al.

(10) Patent No.: US 7,779,092 B2
(45) Date of Patent: *Aug. 17, 2010

(54) METHOD AND SYSTEM TO MANAGE SERVICES FOR MULTIPLE MANAGED COMPUTER SYSTEMS

(75) Inventors: Russell S. Rive, San Francisco, CA (US); Peter Joshua Rive, San Francisco, CA (US)

(73) Assignee: Dell Marketing USA, L.P., Round Rock, TX (US)

( * ) Notice: Subject to any disclaimer, the term of this patent is extended or adjusted under 35 U.S.C. 154(b) by 89 days.

This patent is subject to a terminal disclaimer.

(21) Appl. No.: 12/193,272

(22) Filed: Aug. 18, 2008

(65) Prior Publication Data

US 2009/0094350 A1    Apr. 9, 2009

Related U.S. Application Data

(63) Continuation of application No. 10/125,047, filed on Apr. 17, 2002, now Pat. No. 7,430,590.

(51) Int. Cl.
*G06F 15/177* (2006.01)
*G06F 15/16* (2006.01)

(52) U.S. Cl. ................................. 709/220; 709/203
(58) Field of Classification Search ............. 709/220, 709/203
See application file for complete search history.

(56) References Cited

U.S. PATENT DOCUMENTS

| | | | |
|---|---|---|---|
| 5,155,847 A | 10/1992 | Kirouac et al. | |
| 5,247,683 A | 9/1993 | Holmes et al. | |
| 5,421,009 A | 5/1995 | Platt | |
| 5,742,829 A | 4/1998 | Davis et al. | |
| 5,752,042 A | 5/1998 | Cole et al. | |
| 5,790,796 A | 8/1998 | Sadowsky | |
| 5,845,090 A | 12/1998 | Collins, III et al. | |
| 5,933,647 A | 8/1999 | Aronberg et al. | |
| 5,999,740 A | 12/1999 | Rowley | |
| 6,006,034 A | 12/1999 | Heath et al. | |
| 6,009,274 A | 12/1999 | Fletcher et al. | |

(Continued)

OTHER PUBLICATIONS

"Amendment and Response (U.S. Appl. No. 10/125,047) Non Final Office Action mailed Aug. 13, 2007 and response filed Nov. 12, 2007", 4 pgs.

(Continued)

*Primary Examiner*—Hussein A. Elchanti
(74) *Attorney, Agent, or Firm*—Schwegman, Lundberg & Woessner, P.A.

(57) ABSTRACT

A method to facilitate provision of services to a managed system (e.g., a PC, PDA, cell phone) includes causing installation of an agent application on the managed system, the agent application including an install component to install at least one of a plurality of service applications on the managed system. Each of the plurality of service applications is to facilitate provision of a service provided by a respective service provider of a number of service providers to the managed system. A service input (e.g., from an IT administrator) is received at the management system. The service input identifies a subset of a number of service applications to be installed on the managed system. The subset of service applications is distributed to the managed system for installation by the agent application on the managed system.

21 Claims, 21 Drawing Sheets

U.S. PATENT DOCUMENTS

| | | | |
|---|---|---|---|
| 6,067,582 | A | 5/2000 | Smith et al. |
| 6,125,390 | A | 9/2000 | Touboul |
| 6,199,204 | B1 | 3/2001 | Donohue |
| 6,202,207 | B1 | 3/2001 | Donohue |
| 6,282,711 | B1 | 8/2001 | Halpern et al. |
| 6,324,690 | B1 | 11/2001 | Luu |
| 6,324,691 | B1 | 11/2001 | Gazdik |
| 6,327,617 | B1 | 12/2001 | Fawcett |
| 6,487,718 | B1 | 11/2002 | Rodriguez et al. |
| 6,802,061 | B1 | 10/2004 | Parthasarathy et al. |
| 6,971,094 | B1 | 11/2005 | Ly |

OTHER PUBLICATIONS

"U.S. Appl. No. 10/125,047, Notice of Allowance mailed May 13, 2008", NOAR,(6pgs).

"U.S. Appl. No. 10/125,047, Response filed Apr. 10, 2008 to Non-Final Office Action mailed Mar. 17, 2008", 13 pgs.

"U.S. Appl. No. 10/125,047 Final Office Action mailed Mar. 17, 2008", FOAR,2 pgs.

"Everdream", *Harvard Business School*, 9-800-251. (Rev. Jun. 20, 2000),21 pgs.

"Everdream Announces "Everdream Direct"", *Everdream Direct press release*, (Oct. 29, 2001), 1 pg.

"Written opionion for international application No. PCT US3 12004", (May 7, 2006),5 pgs.

Bolding, Jeb , "Desktop Management", *Network World ASP Newsletter*, [Online]. Retrieved from the Internet: <URL:Http://Web.archive.org/web/20011205211058/www.nwfusion.com/newsletters/asp/2001/01123438.html>, (Nov. 26, 2001),2 pgs.

Poor, A. , "Everdream", *PC Magazine*, (Mar. 2001),1.

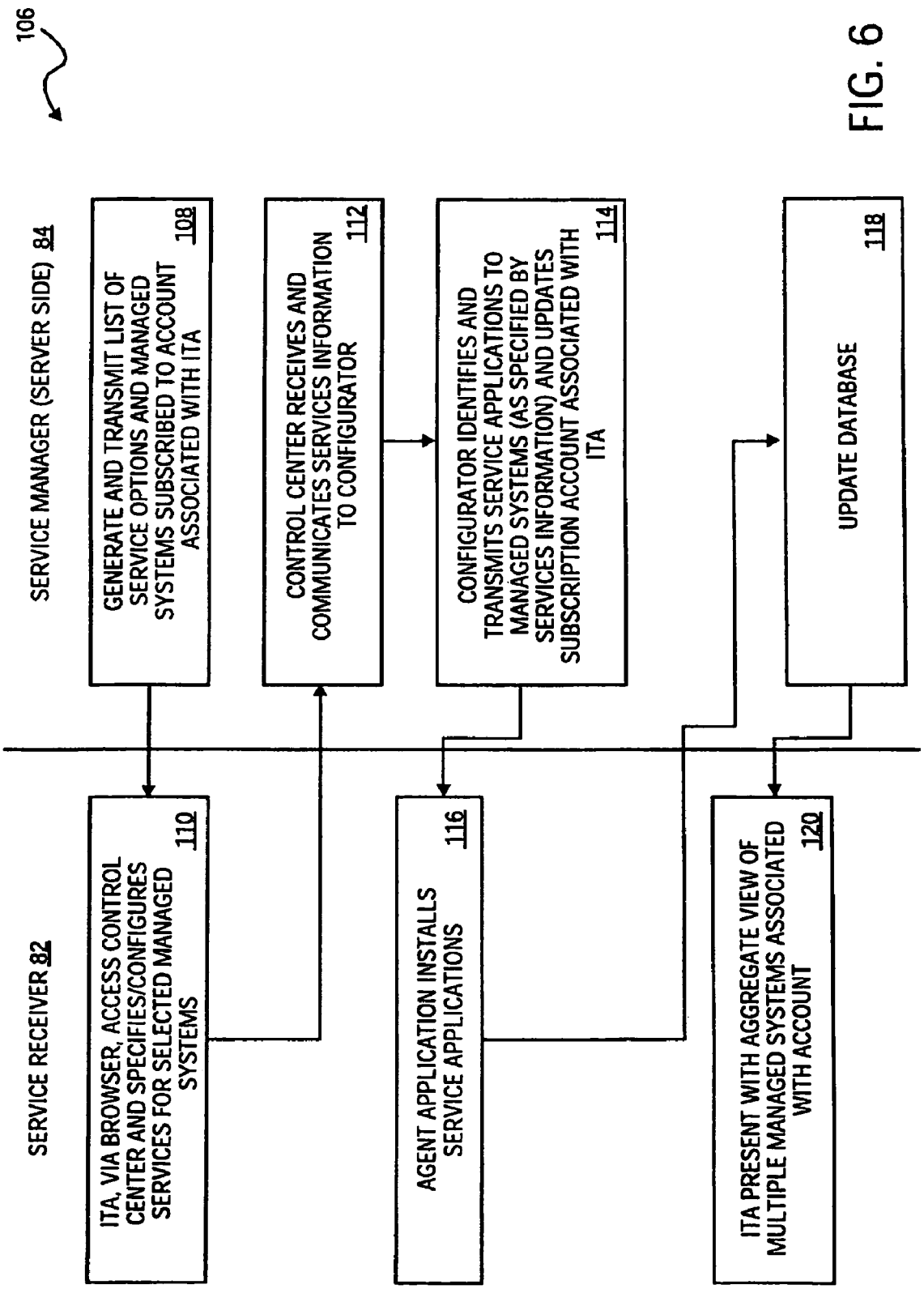

METHOD AND SYSTEM TO MANAGE SERVICES FOR MULTIPLE MANAGED COMPUTER SYSTEMS

This application is a continuation of U.S. application Ser. No. 10/125,047 filed Apr. 17, 2002 now U.S. Pat. No. 7,430,590; which application is incorporated in its entirety herein by reference.

FIELD OF THE INVENTION

The present invention relates generally to the field of managing services utilizing a computer-based system and, more specifically, to a method and system for managing services for a number of managed systems.

BACKGROUND OF THE INVENTION

The deployment of computer systems in the workplace has become increasingly widespread, and computer systems have become indispensable tools for workers in most industries. The challenge of providing adequate management and support for such computer systems has paralleled this deployment. Organizations with more than a few computers may employ an Information Technology (IT) professional (e.g., an IT administrator) to manage computer systems and networks of the organization. An IT administrator typically burdened with a large number of tasks and responsibilities relating to such computer systems and networks. For example, the IT administrator, and supporting staff, are typically responsible for the installation and set up of computer systems and networks within an organization, the upgrading and maintenance of installed computer systems, and responding to service requests from users within the organization.

Although technology has in recent years driven the cost of computer systems down, service and support costs continue to escalate.

The challenges facing IT professionals within organizations have been compounded by the emergence of an increasingly mobile and distributed workforce. For example, an increasing number of employees are opting to telecommute. Further, as workers become increasingly mobile, there is an increasing demand for applications to be deployed on mobile devices (e.g., notebook computers, Personal Digital Assistants (PDAs), etc.). The responsibility for installing, maintaining and upgrading the software on such mobile devices falls within the increasing number of challenges facing IT professionals.

SUMMARY OF THE INVENTION

According to one aspect of the present invention, there is provided a method to facilitate provision of services to a managed system. The method includes causing installation of an agent application on the managed system, the agent application including an install component to install at least one of a plurality of service applications on the managed system, wherein each of the plurality of service applications is to facilitate provision of a service provided by a respective service provider of a plurality of service providers to the managed system. A service input is received at the management system, the service input identifying a subset of a plurality of service applications to be installed on the managed system. The subset of the plurality of service applications is distributed from the management system to the managed system for installation by the agent application on the managed system.

BRIEF DESCRIPTION OF THE DRAWINGS

The present invention is illustrated by way of example and not limitation in the figures of the accompanying drawings, in which like references indicate similar elements and in which:

FIG. 6 is a flow chart illustrating a method, according to an exemplary embodiment of the present invention, of managing a managed system, by facilitating the delivery of services to the managed system and managing the services and assets (e.g., software and hardware assets) of the managed system.

FIG. 15 illustrates asset management report interface, according to an exemplary embodiment of the present invention, which may be returned responsive to search criteria inputted into the search interface.

FIG. 16 illustrates an assets details interface, according to an exemplary embodiment of the present invention, which may be generated by the assets application of the control center.

FIG. 17 illustrates a service request interface, according to an exemplary embodiment of the present invention, which may be generated by the services application of the control center.

FIG. 18 illustrates a service request details interface, according to an exemplary embodiment of the present invention, which again may be generated by the services application of the control center.

DETAILED DESCRIPTION

A method and system for managing services for a managed computer system are described. In the following description, for purposes of explanation, numerous specific details are set forth in order to provide a thorough understanding of the present invention. It will be evident, however, to one skilled in the art that the present invention may be practiced without these specific details.

Figure 1:
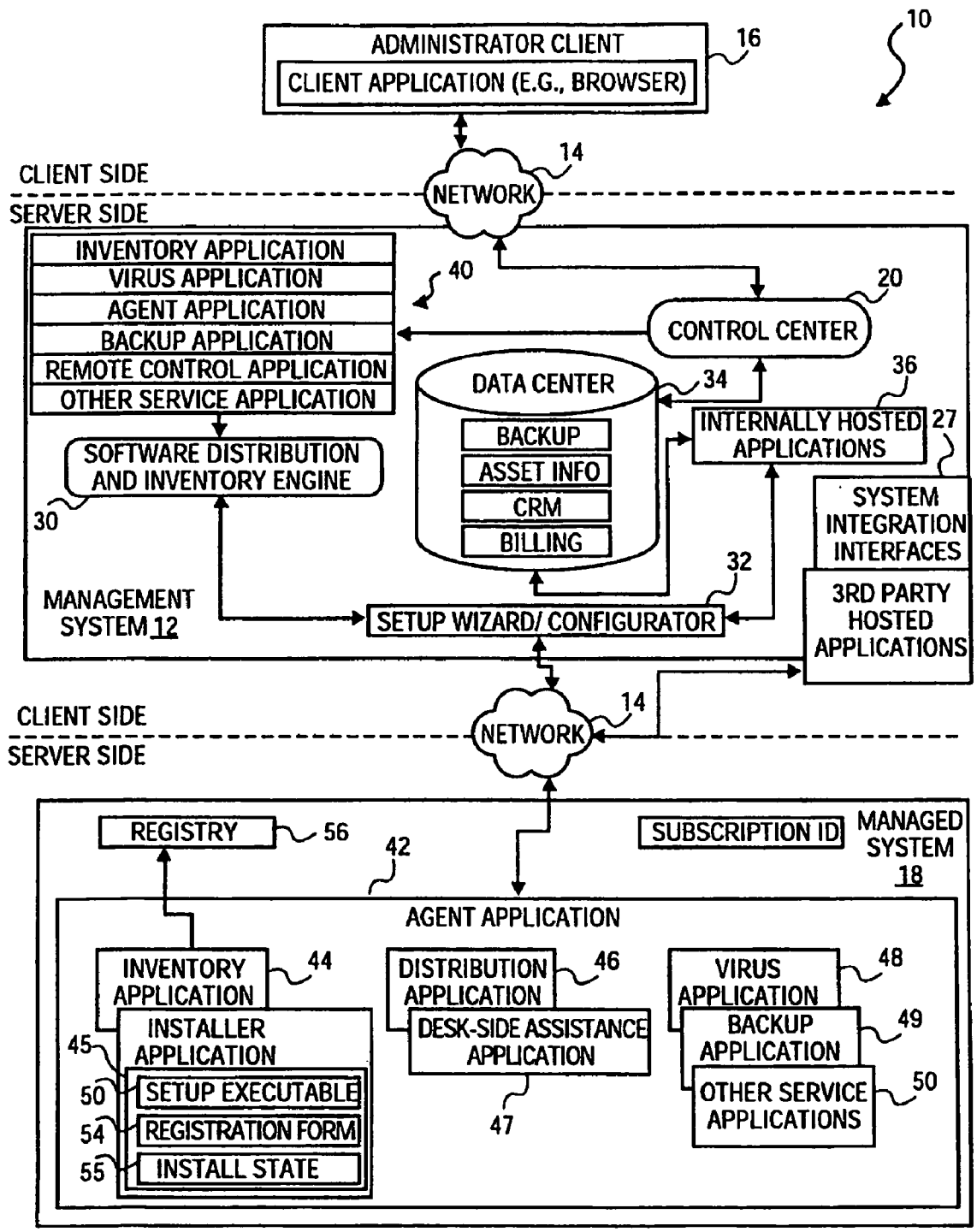
FIG. 1 is a block diagram illustrating a system, according to an exemplary embodiment of the present invention, to manage services for multiple managed computer systems.

FIG. 1 is a block diagram illustrating a system 10, according to an exemplary embodiment of the present invention, to manage services for multiple managed computer systems. Included within the exemplary system 10 is a management system 12, which is coupled by a network 14 (e.g., the Internet) to an administrator client 16 and one or more managed systems 18. The managed systems 18 may be located remotely from the management system 12, or at the same location. The managed systems 18 may each be any one of a number of types of devices or systems including, but not limited to, a personal computer (PC), workstation, Personal Digital Assistant (PDA), set-top box (STB), cellular telephone, network device (e.g., switch, router, or bridge) or an other device capable of executing software.

Turning first to the management system 12, a number of applications and engines are integrated into a single framework that utilizes an open architecture and industry standards to provide an Information Technology (IT) management platform. Service applications may be hosted at an operator of the management system 12 (e.g., a Managed Service Provider (MSP)), or may be hosted by a third-party vendor. The management system 12, in one embodiment, utilizes web services (e.g., the Simple Object Application Protocol (SOAP)), to facilitate systems integration.

Figure 2:
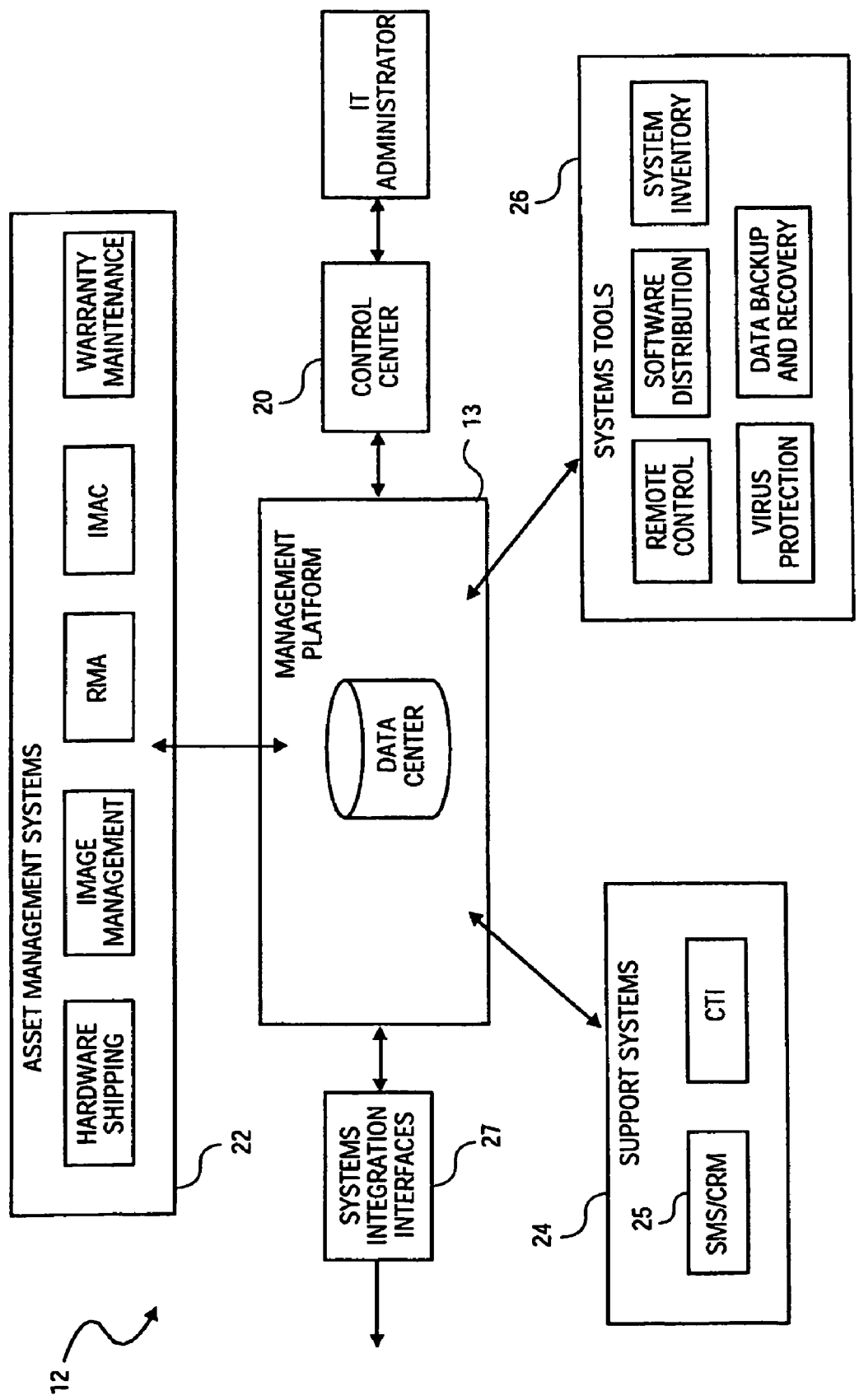
FIG. 2 is a block diagram illustrating a conceptual representation of the management system, according to an exemplary embodiment of the present invention.

FIG. 2 is a block diagram illustrating a conceptual representation of the management system 12, according to an exemplary embodiment of the present invention. The system 12 may conceptually be viewed, in one exemplary embodiment, as providing asset management systems 22 that provide access to a range of asset management functions, and support systems 24 to assist IT professionals in providing and managing services to managed systems 18. The asset management functions provided by the asset management systems 22 may include physical asset (e.g., hardware and software) information (e.g., location, asset inventory, etc.), financial information (e.g., procurement, ownership) and warranty/service information (e.g., entitlements, service history, etc.). Physical asset information may include asset location and asset inventory information. Asset location information is tracked from inventory to installation to disposal via a manufacturing system (not shown). Further, an active user of a managed system 18 may be monitored and the physical asset information automatically updated. In one embodiment, utilizing the physical asset information, an IT professional can classify managed systems 18 according to cost centered geographic distribution. In a further embodiment, physical asset information may be imported into the management system 12 from a third-party system utilizing an appropriate system integration interface 27.

A physical asset information may be obtained on a regular basis by the management system 12 utilizing WMI, DMI, registry and file queries that track hardware configurations and installed software on managed systems 18. Utilizing the queried information an IT professional can, for example, utilize a control center 20, discussed below and provided by the management system 12, to compare purchased licenses with installed software to ensure compliance. Furthermore, an IT professional may view specific assets to identify non-approved applications that have been installed. An IT professional, or end user of a managed system 18, in one embodiment, is enabled to import or manually enter license information into the asset management systems 22 of the management system 12 via the control center 20.

Financial information detailing procurement and ownership of assets (e.g., managed systems 18) may, in one embodiment, be compiled through order and financial systems incorporated within the management system 12, or may be imported into the management system 12 from a third-party system. Service and warranty information outlines asset entitlements and service history. This information, in one embodiment, may be stored within the context of the support systems 24 and updated via the control center 20.

Turning now specifically to the support systems 24, in one exemplary embodiment, the support systems 24 assist an IT professional (e.g., a solutions analysis) in providing service in two areas, namely service request management and telephony systems. The support systems 24 are shown in FIG. 2 to include a service management system 25, or a Customer Relationship Management (CRM) system, to manage service requests and service workload. The CRM system may operate as a subscription component and be updated to reflect an entitlement (e.g., as a result of a subscription agreement) of a particular managed system 18 to a number of service applications 40, responsive to a distribution request.

The service management system 25 may be utilized to service requests for compliance with a service level agreement and also to provide managers with relevant statistics (e.g., problem resolution times, open service requests, etc.). In addition, custom workflow rules may be defined within a graphical environment to create appropriate responses for a range of situations. In one embodiment, the service management system 25 may be Siebel Service™ service management system.

The support systems 24, in one embodiment, also enable support to be provided across multiple support organizations. To this end, the support systems 24 may enable "virtual support communities" where service requests require collaboration. Specifically, an external support vendor is provided with the ability to access and modify service requests through the control center 20. However, if a particular support vendor already has existing systems in place for service request management, systems integration interfaces 27 (e.g., using XML/ SOAP) may be utilized for systems integration. In one embodiment, the systems integration interfaces 27 may be implemented according to the Service Incident Exchange (SIE) standard created by the Consortium for Service Innovation, in partnership with the Distributed Management Task Force.

The telephony infrastructure of the management platform 13 (e.g., Computer Telephony Integration (CTI) infrastructure) may facilitate any number of features, such as real-time fail-over across distributed call centers, detailed call metrics at granular levels, Computer Telephony Integration (CTI) for call center efficiency, centralized call routing rules, and custom Interactive Voice Recognition (IVR) on a per number basis.

System tools 26, in one embodiment, reside on the managed system 18 and are responsible for a number of services to the managed systems 18 (e.g., self-maintenance, system protection and disaster recovery). These system tools 26 may be deployed after installation of an agent (or service management) application 42 on a managed system 18, as will be described in further detail below. The system tools 26 may be utilized by an end user of the managed system 18 or by support staff of a managed service provider to assist in problem resolution. Two exemplary system tools 26 that may be provided are data back-up and recovery, and virus protection.

Returning now to the high-level architectural representation of the system 10 provided in FIG. 1, a more detailed description of the architecture will now be provided. The management system 12, in one exemplary embodiment, is shown to include the control center 20, a software distribution and inventory engine 30, a configurator 32, a data center 34, a collection of internally-hosted applications 36, and the system integration interfaces 27 that enable access to one or more third-party hosted applications 38.

Considering first the control center 20, in one exemplary embodiment the control center 20 includes a secure web application that allows an IT professional (e.g., an administrator) to specify, configure, and view services that are being delivered to multiple managed systems 18. For example, the control center 20 may allow an IT professional to access desktop and service data operations. Analytical services and reports are driven off data stored in the data center 34, which collects data from multiple applications within the management system 12 and stores the collected data in a database scheme suited for standard and custom reports. Application servers and databases that constitute the control center 20 reside behind a firewall and are secured by data segregation, user authentication, and secure data transport (e.g., HTTPS).

The control center 20 may enable an IT professional to manage assets and services by issuing queries across system inventory (e.g., hardware, software and services (e.g., network access)), users, physical location and cost centers, manage software licenses, and access new system rollout information. An IT professional may also query service request information (e.g., response times), and update and create service requests. In addition, the control center 20 allows an IT professional to manage deployment of an agent application 42 (described below) to multiple managed systems 18 and to create new deployment configurations. The control center 20 also provides reporting and administrative capabilities to an IT professional. For example, the control center 20 is able to generate graphical reports, and also to deliver exportable data for additional analysis.

In summary, an IT professional can log into the control center 20, and view the status of multiple managed services, and remove and modify selected services from selected managed systems 18.

FIG. 1 shows the control center 20 as communicating service input, received from an IT professional, that identifies a number of services (each of which may be enabled by a respective application (or package) 40) to the software distribution and inventory engine 30. In addition to the service input, the control center 20 also receives group input from an IT professional, the group input identifying the managed systems 18 to which the services identified by the service input are to be delivered. For example, the services and group input may specify that a first subset of available services offered and/or managed by the management system 12 be delivered to a specific managed system 18, and a different subset of available services be delivered to a further managed system 18.

The software distribution and inventory engine 30, responsive to the group and services inputs, identifies and communicates to a configurator 32 a collection of service applications, which enable the provision and management of services, to be installed on one or more managed systems 18 as "components" of an agent application 42. The configurator 32, in one embodiment, operates to manage the configuration of the services subscribed by and delivered to a managed system 18. To this end, an agent application 42, installed on each managed system 18, operates in conjunction with the configurator 32. Specifically, at an initial registration of a new managed system 18, the configurator 32 runs a "setup wizard" or setup executable 50 to gather information regarding the managed system 18 (e.g., user information), and creates an account with which the managed system 18 is associated. Multiple managed systems 18 may be associated with the single account of an IT professional (e.g., an administrator). The configurator 32, following initial registration, also downloads the setup executable 50 to the managed system 18, whereafter communications can be established between the configurator 32 and the setup executable 50 for the purposes of configuring and installing further services. As is described, the configurator 32 receives a list of services that are to be managed from the control center 20. In one embodiment, as a default, software and hardware inventory services, implemented by an inventory application 44, are loaded onto a managed system 18 by automatically sending an inventory request package to all managed systems 18 following an initial registration.

Following completion of an initial installation, should an IT professional (e.g., an administrator) request additional services to be installed on the managed system 18, the configurator 32 operates to install and register the appropriate services. The configurator 32 receives an instruction that consists of a system identifier and services that need to be installed on the managed system 18 from the control center 20, as inputted by IT professional.

The configurator 32 allows for service configuration applications, (or service applications) shown in FIG. 1 to form part of the agent application 42, to be incorporated within the agent application 42. Such service applications may include, for example, back-up, virus protection, email, Internet connectivity and desk-side assistance/customer service applications. Each application, in one embodiment, includes the ability to create a new account on a service server that may host an application (e.g., an internally-hosted application 36 or a third-party hosted application 38). In the situation that a third-party service provider hosts an application, then a copy of all account creation and configuration information may be stored within the data center 34 in order to enable the control center 20 to query service account information without having to provide the ability to query databases of a third-party directly.

Once an account is created on a service server, the appropriate service is installed and configured on the managed system 18. To this end, an appropriate service application 40 is sent to the managed system 18 (e.g., by sending a command line from the control center 20 to the software distribution and inventory engine 30 to send the appropriate application or package to the managed system 18 via the configurator 32).

Once the appropriate service application 40 is downloaded, the configurator 32 configures the service application 40 to conform to the account that it previously created on the service server. When the control center 20 queries the databases of the service server that includes the account information, the control center 20 automatically detects that a new service has been stored on a managed system 18, and indicates this installation. The control center 20 is also responsible for advising a financial system (not shown) that a new service has been added to a managed system 18, and the appropriate account (e.g., an account associated with a particular administrator) will be recognized as the billing account for the newly installed service. While the provision and management of a service is described above as being facilitated by the installation and/or execution of an appropriately configured service application 40 on the managed system 18, it will be appreciated that certain services may not require such an installation and/or execution, and could be provided from a remote location and/or without a service application.

FIG. 1 also illustrates the data center 34 as maintaining information to support the asset management systems 22, the support systems 24, and the system tools 26, described above with reference to FIG. 2.

Figure 3:
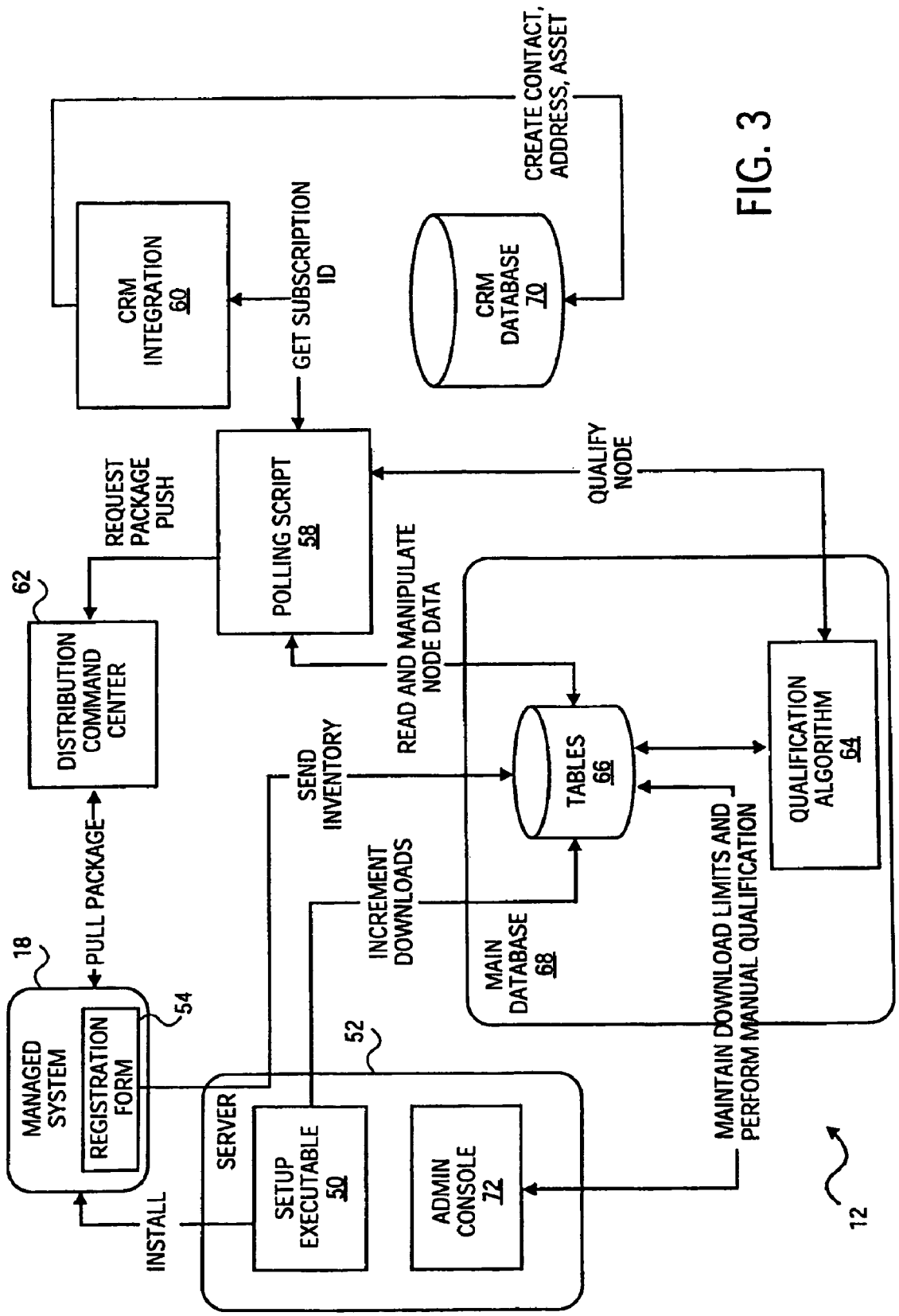
FIG. 3 is a block diagram illustrating further details of the software architecture (as opposed to the service architecture) of the management system, according to an exemplary embodiment of the present invention.

FIG. 3 is a block diagram illustrating further details of the software architecture (as opposed to the service architecture) of the management system 12, according to an exemplary embodiment of the present invention. The management system 12, illustrated in FIG. 3, operates to deploy and integrate a number of services to a managed system 18. Such services may be, in one exemplary embodiment, provided partially by an operator of the management system 12 and provided partially by third-party vendors.

The management system 12 may include a number of different components executing on different systems. It should be noted that the components illustrated in FIG. 3 are not necessarily physical components (e.g., which have interfaces accessible through an API), but may be components described for the purposes of facilitating understanding of an exemplary software architecture. However, each of the components illustrated in FIG. 3 may ultimately be implemented in code within the management system 12.

The technology architecture of the management system 12, as illustrated in FIG. 3 and according to an exemplary embodiment, is a combination of third-party applications, C++ service applications, scripts, stored procedures and active server pages. Each of the components illustrated in FIG. 3 will now be discussed in further detail.

A setup executable 50 is stored on a server 52, and is downloaded to and executes on a managed system 18 to install one or more service applications 40 (e.g., a distribution application 46, a desk-side assistance application 47, and an inventory application) on the managed system 18. For example, the distribution application 46 may be a software component developed by Mobile Automation (e.g., the Mobile Automation 2000 Enterprise Edition). The desk-side assistance application 47 may be supplied by Control-F1, or Microsoft Corp. (e.g., NetMeeting) and may include system diagnostic capabilities. In addition the setup executable 50 may operate to install a "help" window, and insert appropriate short cuts for assistance and information into a "Start Menu" on the managed system 18.

In one embodiment, the setup executable 50 is account-specific, in that every account has a different binary and account number. Each account furthermore may have a finite number of downloads, which number is maintained in the data center 34. The setup executable 50, as described above, also displays a user registration form 54 to a user of the managed system 18 during installation, which takes control of and directs the setup procedure performed by the setup executable 50.

Dealing now more specifically with the registration form 54, this form 54 prompts a user of the managed system 18 for information (e.g., name, address, etc.), and may write this information to a registry 56 on the managed system 18. In one embodiment, the setup executable 50 initiates a registration information executable on the managed system 18 that presents the registration form 54 to the user. The user completes the form 54 and submits the information. The setup executable 50 then creates shortcuts, installs a progress monitor and a communication window, installs the desk-side assistance application 47, and installs the distribution application 46.

A polling script 58 monitors all new registrations of managed systems 18, obtains a subscription identifier from a CRM integration application 60, pushes packages (or applications) to support additional services to the managed system 18 via a distribution command center 62, and provides emails to a user of the managed system 18, or an appropriate administrator, regarding updates to the managed system 18. The obtaining of a subscription identifier by the polling script 58 is contingent on the managed system 18 qualifying to receive delivery of one or more services. To this end, the polling script 58 interacts with a qualification algorithm 64 to qualify a managed system 18. In one embodiment, the polling script 58 makes calls to the qualification algorithm 64 (e.g., a stored procedure). If the qualification succeeds, the subscription identifier is created and a services application 40 (or packages) is pushed to the managed system 18. The user of the managed system 18 is then sent an email including the subscription identifier associated with the managed system 18 and/or the user.

The pushing of a services application 40 from the distribution command center 62 to the managed system 18 is, in one embodiment, accomplished by making an HTTP connection to a network node (e.g., an Active Server Page (ASP)). Specifically, a HTTP connection may be to an ASP page that takes as parameters a node identifier identifying the managed system 18, and a package identifier identifying the appropriate services application(s) 40. In an alternative embodiment, a direct COM call may be utilized to push the services application 40. However, the HTTP connection offers an advantage in that it does not require installation and maintenance of COM objects on a machine besides the distribution command center 62.

The qualification algorithm 64, in one exemplary embodiment, is a stored procedure that uses inventory information retrieved from a managed system 18 (e.g., inventory files and machine tables) in order to assess whether a managed system 18 qualifies for the provision and management of one or more services by the management system 12. For example, the inventory information may be matched against one or more qualification rules to determine whether the managed system 18 can be supported by the management system 12, and also whether one or more specific services can be provided and managed by the management system 12. To this end, different qualification rules may be associated with different services, depending upon the requirements to provide the respective services. It will be appreciated that the provision and maintenance of each service may have specific requirements that may be different from the requirements for other services. For example, a backup service may require a broadband connection between the managed system 18 and a service provider, whereas the provision of a virus service may only require a narrowband connection between the managed system 18 and a service provider.

The qualification algorithm 64 may further assess whether the managed system 18 has both the software and hardware components to support provision and management of a specific service.

In one embodiment, the inventory information utilized by the qualification algorithm 64 to qualify a managed system may be stored in an appropriate table 66 within a main database 68 of the data center 34. As discussed above, an inventory application 44 installed on the managed system 18 may, as part of the operations performed under the setup executable 50, harvest software, hardware and services (e.g., regarding existing services to which the managed system 18 has access) inventory information pertaining to the managed system 18. This information is then communicated to the management system 12 for storage within the table 66. Accordingly, the qualification algorithm 64 accesses this table 66 in order to obtain the inventory information to qualify the managed system 18. In an alternative embodiment, the qualification algorithm 64, in response to a request for qualification from the polling script 58, retrieves the inventory information directly from the managed system 18. In this case the inventory information is not necessarily stored within the main database 68. In the embodiment in which the inventory information is stored within table 66, the main database 68 may be regarded as including a central inventory database that is accessed by the qualification algorithm 64.

FIG. 3 also illustrates the management system 12 as including the CRM integration application 60 that is responsible for generation of a subscription identifier responsive to a request from the polling script 58.

In one embodiment, the polling script 58 posts all fields for which information was received via the registration form 54 to an ASP page. The ASP page makes a call to a Java-built object, which inserts the information into a CRM database 70 associated with the CRM integration application 60.

The CRM integration application 60 is responsible for a generation of a subscription identifier, and also for the creation and maintenance of contact and account records for a customer of the management system 12. For example, a single customer (e.g., corporation) may have specific contact information, as well as a single account with which a number of managed systems 18 are associated.

It should also be noted that the installation of the agent application 40 is tightly integrated with the CRM database 70 by the CRM integration application 60. Specifically, the CRM integration application 60 automatically generates "trouble tickets" at the management system 12 if any part of the installation and/or configuration process fails or experiences difficulties.

In an exemplary embodiment, following the call from the ASP page, the ASP page returns a single string including the subscription identifier to a HTTP response buffer.

FIG. 3 also illustrates the server 52 as supporting an administrative console 72 that, according to an exemplary embodiment, includes a set of users interfaces that enable an administrator of the management system 12 to a manage accounts and downloads, and manually to force qualification, for example. Specifically, in one embodiment, Active Server Pages (ASP's) constitute this component and allow an administrator within the management system 12 to maintain account downloads (e.g., set a maximum number of downloads, view a download log, etc.) and manually to force qualification for one or more managed systems 18 if such managed systems 18 were failed by the qualification algorithm 64. When a manual qualification is forced, the appropriate ASP updates appropriate tables 66 within the main database 68 to indicate the qualification. The polling script 58 then recognizes the manually forced qualification, and sends the appropriate services application 40 to the appropriate managed system 18.

Regarding the various services that may be delivered to, and managed for, a managed system 18, the provision and management of each service may be facilitated by the installation of an appropriate service application 40 on the managed system 18. Each of the service applications 40 may include a dedicated installer, and be distributed either as part of an initial setup, or may be pushed to the managed system 18 subsequent to qualification of the managed system 18. The subsequent pushing of a service application 40 to the managed system 18 may be part of an initial configuration operation performed by the management system 12, or as part of a subsequent request from a customer for installation and/or provision of the relevant service. It should also be noted that, in one embodiment, the installation of service applications 40 might require administrative privileges under an operating system of the managed system 18. Specifically, the administrative privileges that may be required are privileges to write to a disk drive of the managed system 18, to install an application, to update a registry file, and to create services on the managed system 18. In one embodiment, these administrative privileges are obtained utilizing so-called "domain impersonation" which is described in further detail below.

Figure 4:
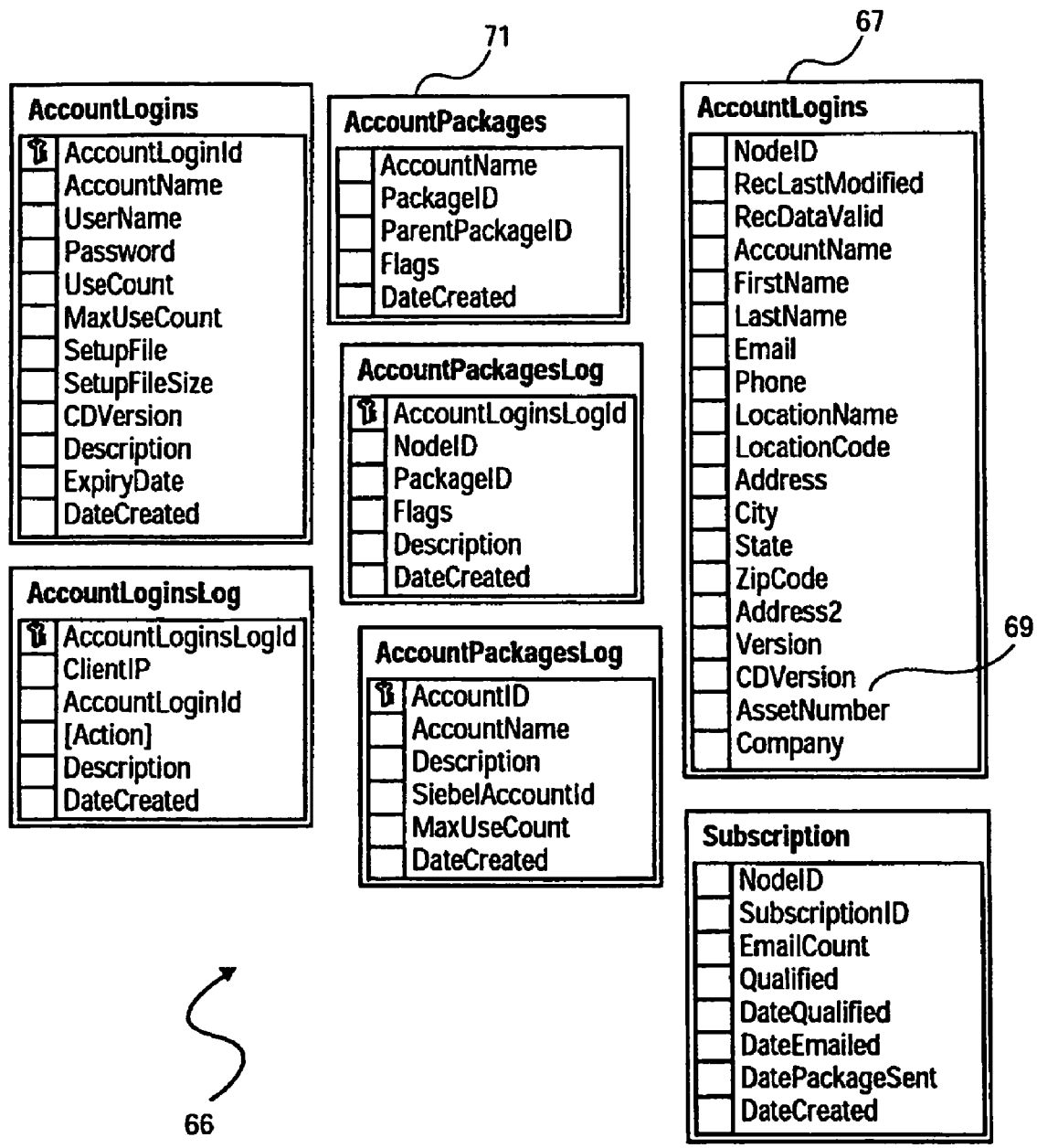
FIG. 4 is a database schema diagram illustrating exemplary tables that may be maintained within main database so as to enable the management system to manage multiple managed systems and the provision of services to the managed systems for disparate service providers.

FIG. 4 is a database schema diagram illustrating exemplary tables 66 that may be maintained within the main database 68 so as to enable the management system 12 to manage multiple managed systems 18 and the provision of services to the managed systems 18 for disparate service providers. Specifically, the illustrated tables may be utilized to maintain information regarding relationships between external applications, and to store management information pertaining to managed systems 18 (or nodes). For example the stored information may indicate the number of downloads per customer account, disqualified systems, user information, etc. As illustrated in FIG. 3, the polling script 58 may read and manipulate data maintained within the tables 66, an inventory application 44 may provide user registration information for inclusion to the tables 66 and the setup executable 50 may write setup information to the tables 66.

In particular, the inventory application 44 may populate a registry asset information table 67 included within the table 66 to associate asset numbers 69 with each managed system 18, each asset number 69 identifying a particular software or hardware asset. An account packages table 71 maintains a record of service applications 40 that have been distributed to, and installed on, one or more managed systems 18 associated with a particular account.

Figure 5:
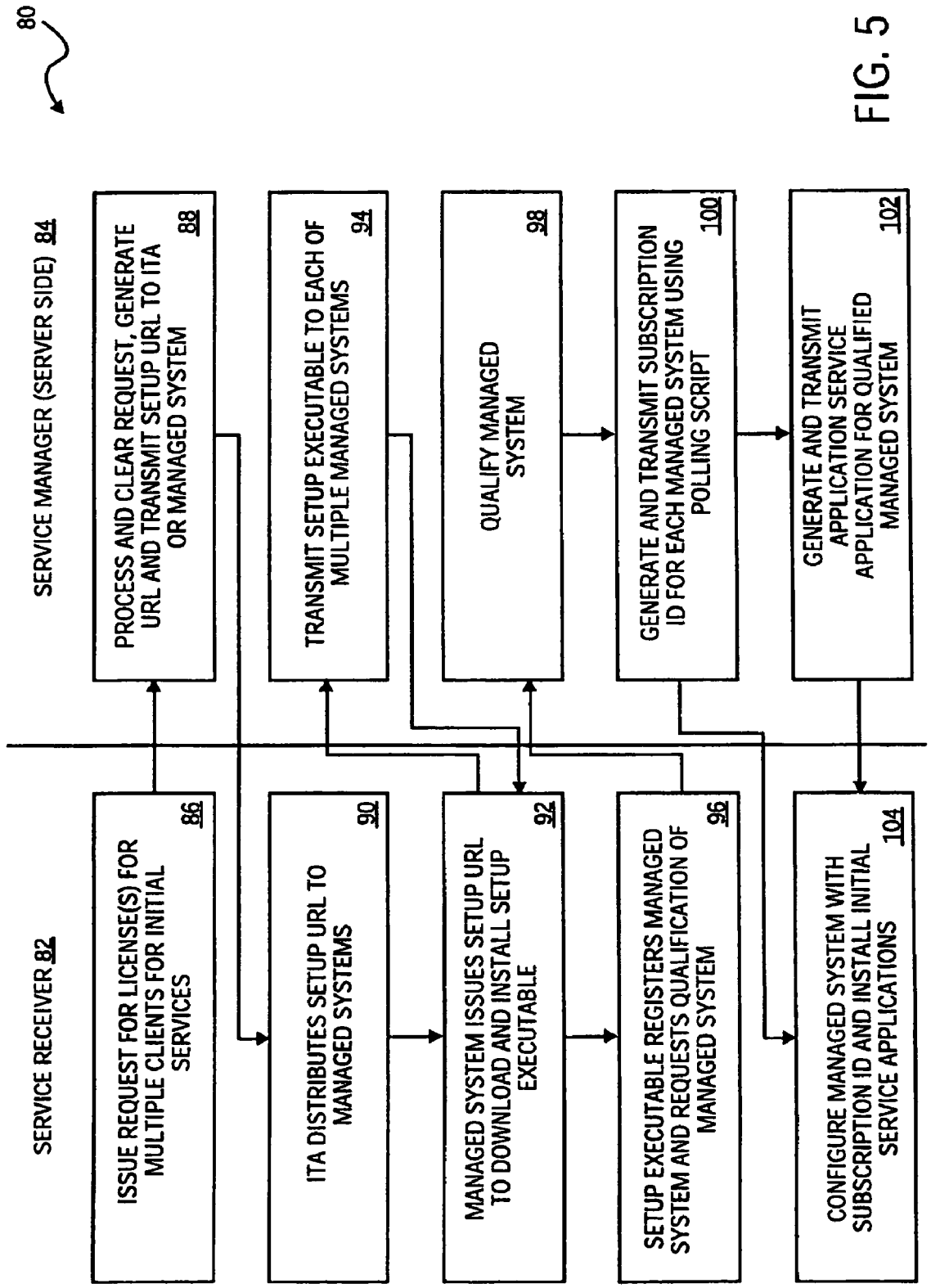
FIG. 5 is a flow chart illustrating a method, according to an exemplary embodiment of the present invention, the delivery of services to a managed system.

FIG. 5 is a flow chart illustrating a method 80, according to an exemplary embodiment of the present invention, the delivery of services to a managed system 18. The method 80 illustrates operations performed both at a service receiver (e.g., an organization employing an information technology administrator "ITA") and at a service manager 84 operating, for example, the management system 12.

At block 86, the service receiver 82 (e.g., the ITA) issues requests to the service manager 84 for the provision of services to multiple managed systems 18. In one embodiment, this request may include a request for licenses to multiple client service applications 40 (e.g., a backup or wireless protection client service application). These licenses may be owned by an operator of the management system 12, and the management system 12 is in this case responsible to the management of these licenses. The operator may in this case also pass the license fees on to an organization utilizing the managed system 18 as part of a periodic subscription fee.

The request issued at block 86 by the service receiver 82 may be composed as input to a HyperText Markup Language (HTML) form communicated from the service manager 84 to the service receiver 82. The contents of this form may then be transmitted to the service manager 84.

At block 88, the service manager 84 processes and clears the request, generates a setup Uniform Resource Locator (URL), and transmits the setup URL to the information technology administrator and/or directly to the managed systems 18 identified in the initial request issued at block 86. The processing and clearing of the request may include parsing the request to identify the requested services, to identify the relevant service receiver, and to identify one or more managed systems 18. The setup URL, in one embodiment, is generated so that communication of the URL from a managed system 18 to the management system 12 initiates a sequence of interactions between the managed system 18 and the management system 12 whereby the provision of managed services to the managed system 18 is facilitated. The examples of the various operations that may be included within such an interaction are described below.

At block 90, in the event that the setup URL has not been communicated to each of the managed systems, the information technology administrator distributes the setup URL to each of the managed systems 18.

At block 92, each of the managed systems 18 then communicates the setup URL to the management system 12 to initiate the download and installation of an agent application. For example, the setup URL may be communicated utilizing the HyperText Transfer Protocol (HTTP) or File Transfer Protocol (FTP). At block 94, the management system 12 of the service manager 84 downloads the setup executable 50 to each of the multiple managed systems 18 from the setup URL was received. For example, where a managed system 18 is a personal computer, the setup executable 50 may be a small application (e.g., approximate 800 kb) that is communicated from the management system 12 utilizing HTTPS or FTP.

The setup executable 50 is described above as being communicated to a managed system 18 utilizing a URL. The setup executable 50 may be distributed to a managed system 18 utilizing any number of other distribution mechanisms, including email, or as stored on a physical medium (e.g., a floppy disk or CD ROM).

Subsequent to the installation of the setup executable 50 at block 92, at block 96 the setup executable 50 registers the managed system 18 on which it has been installed, and requests qualification of the managed system 18 to receive the services that have been identified for delivery to that managed system 18. To perform the registration of the managed system 18, the agent application 42, and specifically the inventory application 44, gathers user information, software inventory information, services inventory information and/or hardware inventory information. This information is then communicated back to the management system 12, and stored within appropriate tables 66 with a main database 68.

At block 98, responsive to the request for qualification of a particular managed system 18, the management system 12 invokes the qualification algorithm 64 to qualify the managed system 18. To this end, the polling script 58 accesses the table 66 within the main database 68, and communicates the user and inventory information gathered at block 96 to the qualification algorithm 64. The polling system 58 also identifies to the qualification algorithm 64 those services that have been identified for delivery to the relevant managed system 18. Utilizing the user, inventory and services information, the qualification algorithm 64 then assesses whether the relevant managed system 18 is qualified (e.g., has the required hardware, software and/or networking capabilities) to successfully receive and utilize each of the requested services. For example, a specific service may require that the managed system 18 have a predetermined minimum network connection bandwidth, have predetermined software installed thereon, or have predetermined hardware (e.g., processor speed, memory, etc.) capabilities. In one embodiment, the activation code discussed herein is linked to the qualification algorithm 64. The activation code is in turn associated with a specific service, or group of services, and the qualification algorithm 64 may utilize the activation code to restrict the qualification requirements (or criteria) to those services being installed and associated with the activation code.

At block 100, the management system 12, assuming a specific managed system 18 is qualified at block 98, generates and transmits a subscription identifier to each qualified managed system 18 in the manner described above.

At block 102, the management system 12 generates and transmits initial service applications 40 (e.g., on initial services package) to each of the qualified managed systems 18, as described above. The initial services package may be "pushed" from the distribution command center 62, (or alternatively "pulled" by the setup executable 50) for installation on a managed system 18.

At block 104, the setup executable 50 then configures each qualified managed system 18 with the subscription identifier, and proceeds to install the initial services package. In one embodiment, the initial services package may include at least a desk-side assistance application 47 and a distribution application 46. The initial services package, in one embodiment, accordingly provides the capability for the installation on the managed system 18 of further service applications (or service packages) to facilitate the delivery of additional services.

FIG. 6 is a flow chart illustrating a method 106, according to an exemplary embodiment of the present invention, of managing a managed system 18, by facilitating the delivery of services to the managed system 18 and managing the services and assets (e.g., software and hardware assets) of the managed system 18.

At block 108, the management system 12 generates and transmits a list of service options and a list of managed systems 18, associated with an account of a particular organization, to an information technology administrator of that organization. The lists of service options and managed systems 18 are transmitted responsive to a request from the information technology administrator.

The exemplary method 106 commences at block 108, when an information technology administrator of an organization, via a browser, accesses the control center 20 provided by the management system 12. Utilizing the control center 20, the information technology administrator specifies and/or configures service to be delivered to selected managed systems 18. To this end, via an HTML interface generated by the control center 20, the information technology administrator may provide a group input to the management system 12 identifying a select group of managed systems 18, and may also a select group of service applications 40 to be included in a services package to be installed on each of the selected managed systems 18. The group of managed systems 18 and the group of services are selected from the list generated and communicated at block 108.

At block 112, the control center 20 of the management system 12 receives group input identifying the group of managed systems 18 and further identifying the selected service applications (e.g., as an HTTP Push). The control center 20 communicates this information to the configurator 32 of the management system 12.

At block 114, the configurator 32 identifies, locates and communicates the service applications 40, as specified by the services information, to the group of managed systems 18 identified by the group input. This communication of the service application 40 is performed, in one embodiment, by the software distribution and inventory engine 30. The configurator 32 also operates to update subscription account information associated with the relevant organization represented by the information technology administrator. For example, a subscription account may be updated to indicate that a number of managed systems 18 of a particular organization have subscribed to additional services, and a subscription charge levied by the management system 12 to that organization may be adjusted accordingly.

At block 116, the agent application 42, and specifically an installer application 45, operates to install the service applications 40, communicated at block 114, on the managed system 18. The installer application 45 is shown to include a setup executable 50, a registration form 54, and an install state application that tracks and monitors the state of various service applications. Responsive to this installation, the registry 56 on the managed system 18 is updated, and the updated registry information is in turn communicated by an inventory application 44 back to the management system 12, to update the main database 68 of the management system 12 at block 118.

At block 120, the information technology administrator, by accessing the control center 20, is able to retrieve an aggregate view of multiple managed systems 18 associated with his or her account. Specifically, this aggregate view may provide asset inventory information, as well as a variety of further information as will be described in further detail below with respect to the control center 20.

While the method 106 describes an exemplary method whereby an information technology administrator may select managed system 18, and select service application 40 to be installed thereon to facilitate the delivery of services, it will be readily be appreciated that the information technology administrator may wish to discontinue the provision of certain select services to select managed services 18. Accordingly, in a manner that somewhat parallels the method 106, the information technology administrator may interact with the management system 12 to uninstall a selected service application 40 from a selected managed system 18, thereby to discontinue the provision of services to that managed system 18. Further, the subscription account associated with the managed system 18 is updated to reflect the discontinued delivery of the service to that managed system 18.

Figure 7A:
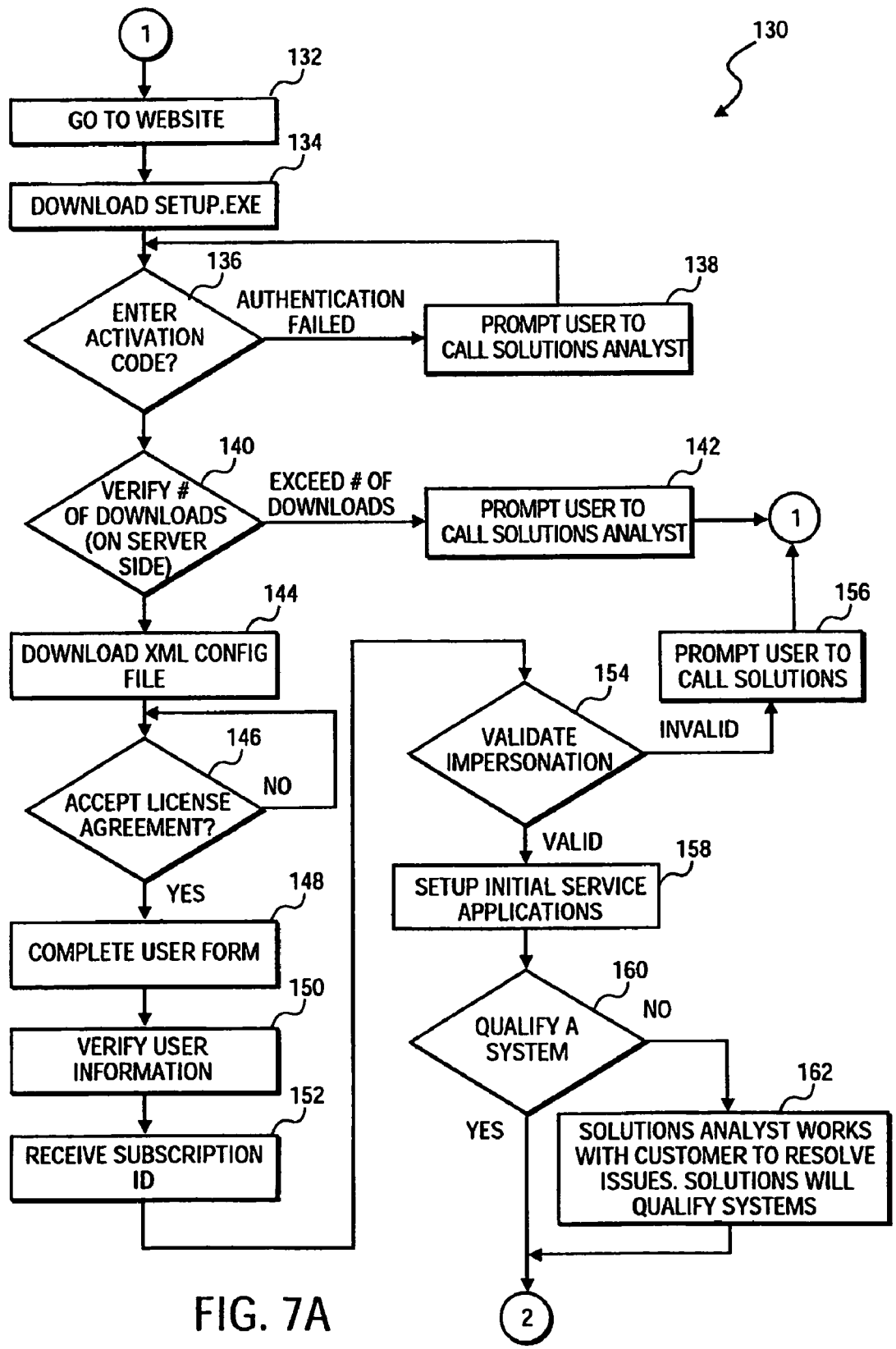
FIGS. 7A and 7B show a flow chart illustrating a method, according to an exemplary embodiment of the present invention, of facilitating user installation of one or more service applications on a managed system.
Figure 7B:
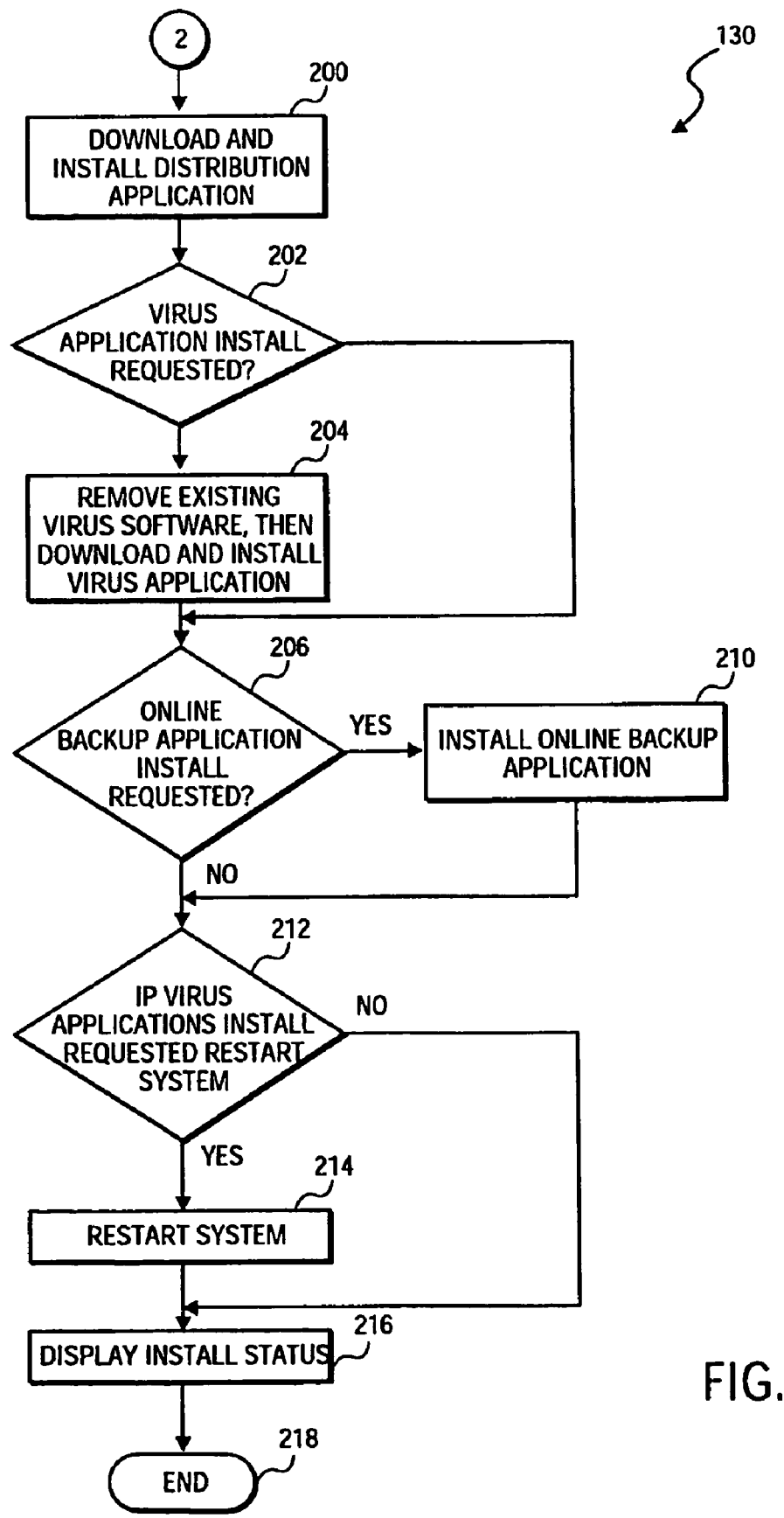

FIGS. 7A and 7B show a flow chart illustrating a method 130, according to an exemplary embodiment of the present invention, of facilitating user installation of one or more service applications 40 on a managed system 18. As described above, with reference to blocks 90-92, in one embodiment, a setup URL may be communicated to enable a user to install one or more service applications 40 on the managed system 18. In alternative embodiments, a setup executable 50 may be provided to a user of a managed system 18 by email, or on a storage medium (e.g., a CD ROM or floppy disk). Block 132 of method 130 assumes the provision of the setup URL, utilizing which the user of the managed system 18 accesses a web site front-end to the management system 12.

Figure 8:
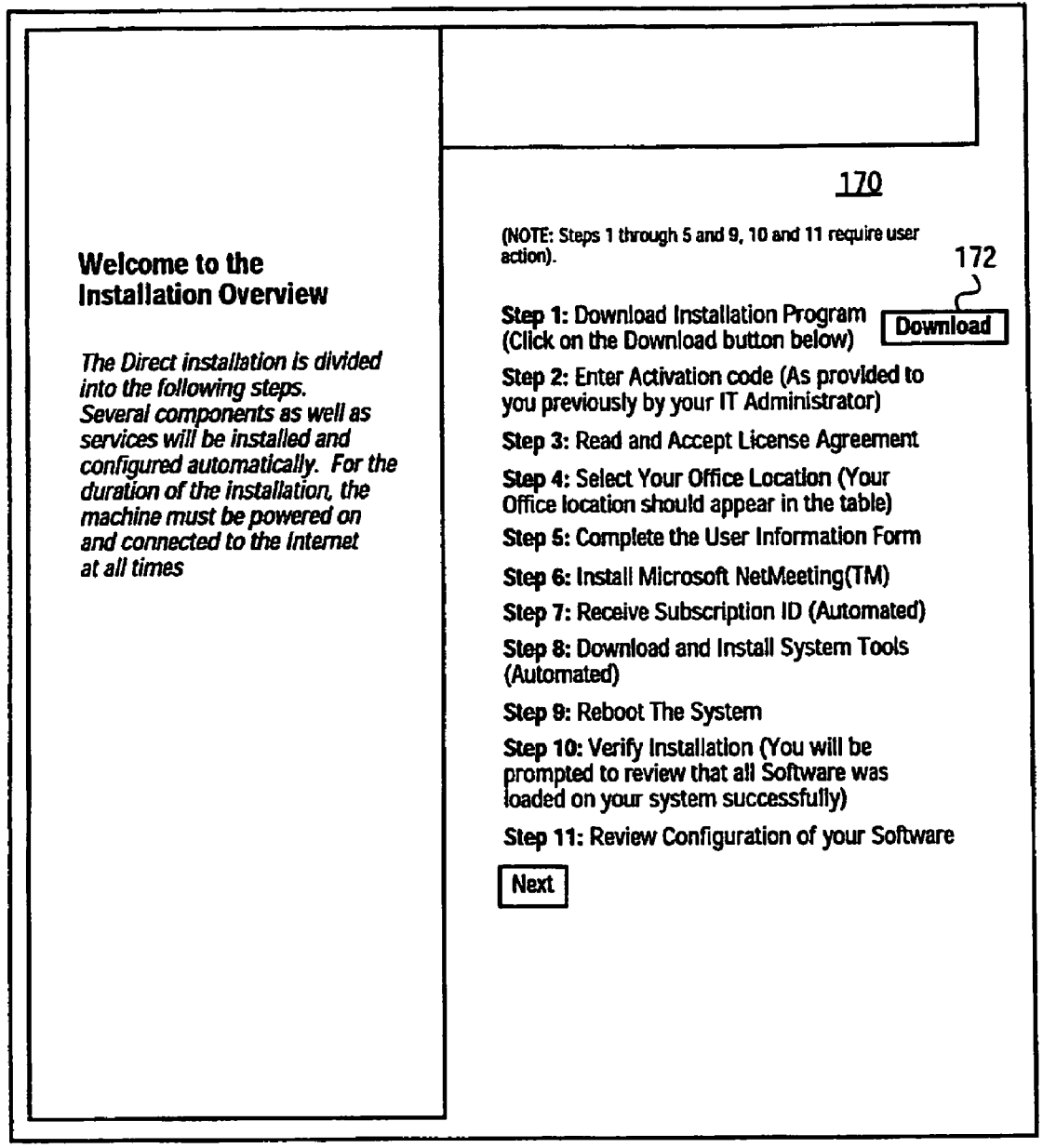
FIG. 8 illustrates an exemplary user interface, in the form of an HTML document, which may be presented to a user upon accessing the web site

FIG. 8 illustrates an exemplary user interface 170, in the form of an HTML document, which may be presented to a user upon accessing the web site at block 132.

At block 134, the user proceeds to download the setup executable 50, for example by a user selection of a "download" button 172 presented within the user interface 170. Responsive to issuance of the download request from the managed system 18 to the management system 12, a sequence of file download dialog boxes may be presented (e.g., by a Windows Operating System executing on the managed system 18) that guide the user through the installation and initial execution of the setup executable 50.

At block 136, the setup executable 50 executes, and prompts the user to enter an activation code. In one embodiment, the activation code is provided independently to the user either by the management system 12, or by an information technology administrator responsible for the managed system 18.

Figure 9:
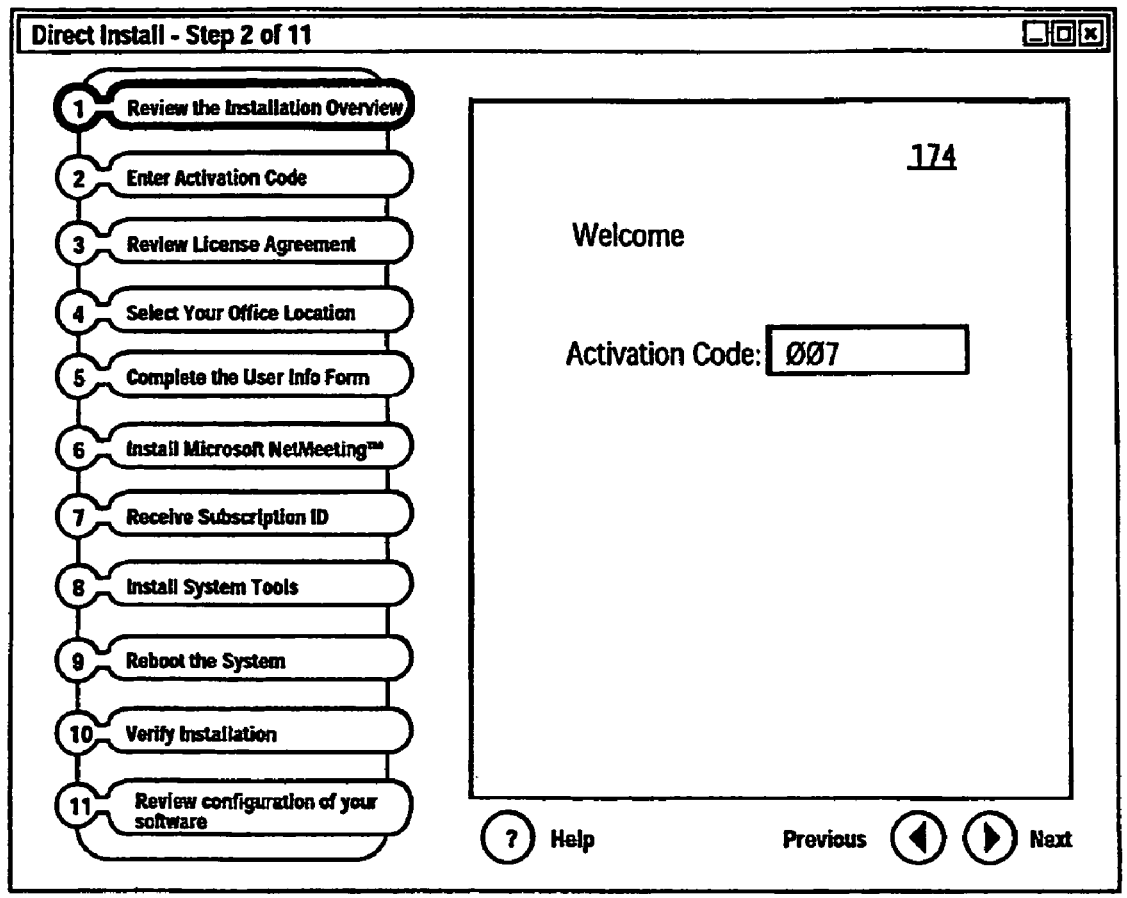
FIGS. 9-11 illustrate exemplary users interface that may be presented by the setup executable to facilitate entry of the activation code by the user and the harvesting of user information.

FIG. 9 illustrates an exemplary user interface 174 that may be presented by the setup executable 50 at decision block 136 to facilitate entry of the activation code by the user.

Also at block 136, the setup executable 50 communicates the activation code to the management system 12, where an authentication operation is performed to authenticate the activation code as being valid. In an alternative embodiment, the setup executable 50 itself may perform the authentication operation. In the event that the authentication operation fails, the user is prompted by the setup executable 50, at block 138, to call a solutions analyst at the management system 12.

Assuming that the entered activation code is valid, at decision block 140 a determination is made as to whether the number of downloads associated with a particular activation code (or with a particular account) have been exceeded. Specifically, a particular activation code may be associated with installations at a predetermined number of managed systems 18 (or "seats"). Alternatively, a predetermined number of service application installations may be associated with a particular account (e.g., an account for a specific organization). In one embodiment, the verification operation at decision block 140 is performed at the management system 12, which tracks numbers of downloads to multiple managed systems 18. In the event that the maximum number of downloads is exceeded, at block 142, the user is again prompted to call a solutions analyst at the management system 12.

Following a positive determination at decision block 140, at decision block 144 a configuration file (e.g., an eXtensible Markup Language (XML) file) is downloaded from the management system 12 to the managed system 18. In one embodiment, the configuration file is created and downloaded from the configurator 32 within the management system 12, and may include XML data having a number of elements identified by tags. The configuration information may include user, location (e.g., office) branding, and system information. The user information is typically only returned for an existing managed system 18 that is updating information. The branding information may include all text and graphics utilized to customize interfaces according to the branding requirements for the managed system 18. For example, the management system 12 may manage services for a particular managed system 18 on behalf of a supplier of hardware and/or software for the managed system 18. In this case, it is attractive to the hardware and/or software supplier to be able to brand the service management to the managed system 18.

In short, the configuration file downloaded at block 144 includes all information required by the setup executable 50 in order to configure the managed system 18 to setup and configure the managed system 18 to receive specified services, and to allow the management system 12 to manage the delivery of these services.

Returning to FIG. 7A, the configuration file may include the text of a license agreement that, at decision block 146, is displayed to the user together with a prompt (e.g., a check box) to accept the license. If the user of the managed system 18 accepts the license, at block 148 the user is prompted by the setup executable 50 to provide information pertaining to the user and the managed system 18.

Figure 10:
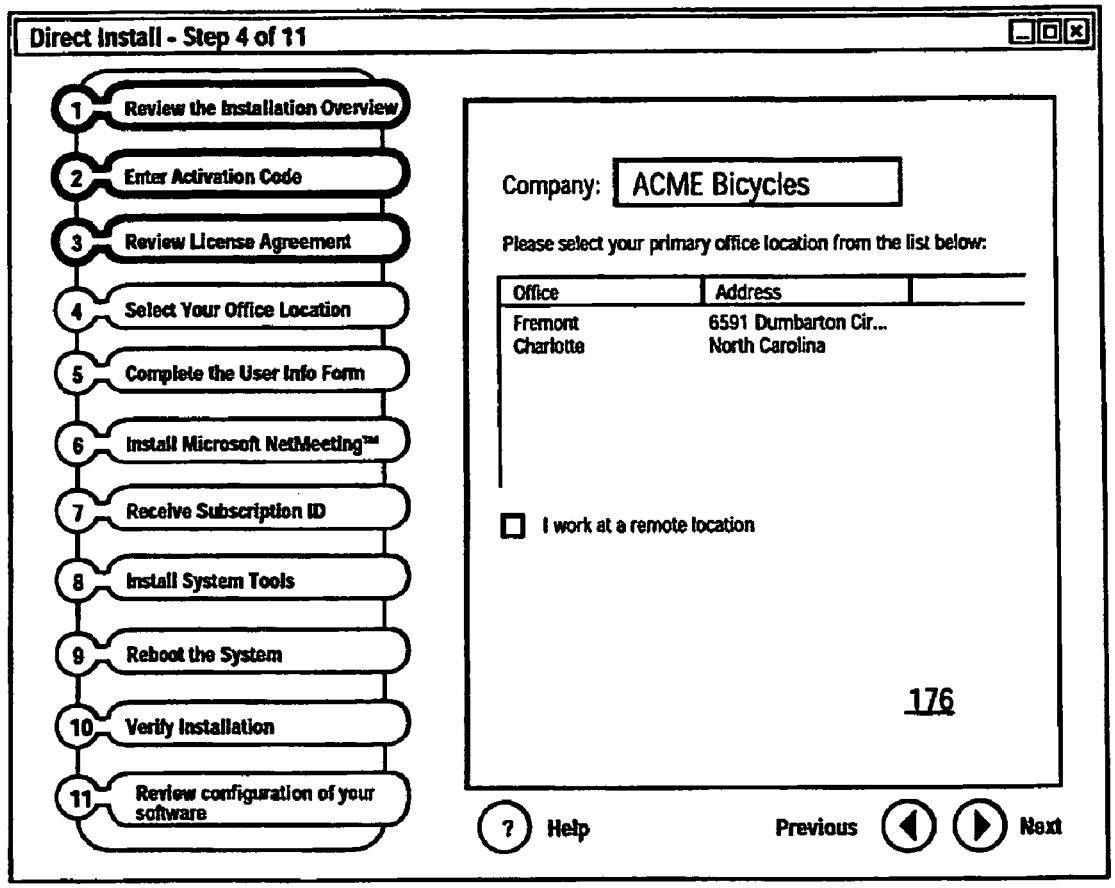
Figure 11:
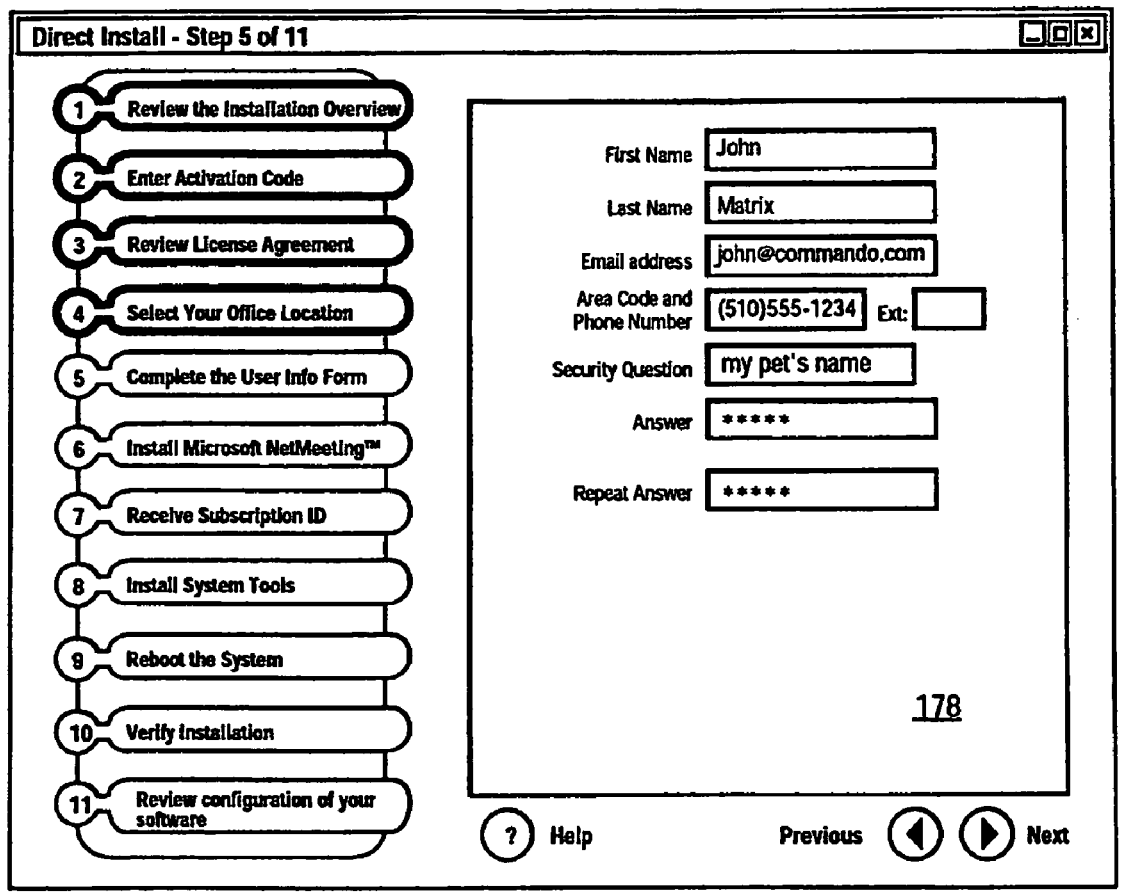

FIGS. 10 and 11 illustrate exemplary user interfaces 176 and 178 that may be utilized to harvest this information. It will be noted that user interface 179 in FIG. 10 presents a list of office locations associated with a particular organization. This list of office locations is included within the configuration file, which in turn generated by the configurator 32 based on information provided to the management system 12 by the organization regarding office locations.

At block 150, the user is then presented with a further interface by the setup executable 50 that requests review and verification of inputted user information. At block 152, the setup executable 50 receives a subscription identifier from the management system 12, which may be displayed to the user. The user will further be instructed to record the subscription identifier for future use.

At decision block 154, a determination is made as to whether the setup executable 50 has successfully been able to perform a so-called "administrator impersonation" operation that provides the setup executable 50 with administrator privileges on the managed system. Specifically, in order to configure the managed system 18 to receive services, the setup executable 50 may require certain privileges that are reserved for an administrator. Further details regarding this administrator impersonation operation are provided below. If the impersonation is determined at decision block 154 not to have been successfully validated, the user is again prompted to call a solutions analyst at the managed system 16 at block 156.

Alternatively, following a valid impersonation, at block 158, the setup executable 50 operates to setup a collection of initial service applications 40, at least some of which enable the management system 12 to manage the provision of services to the managed system 18, and also so as to enable the management system 12 to provide service-related information regarding the managed system 18 to, for example, an information technology administrator. In one exemplary embodiment, the initial service applications 40 that are installed at block 158 may include the inventory application 44, and the distribution application 46, and a desk-side assistance application 47 (e.g., NetMeeting or Control-F1). In one embodiment, the assistance application 47 enables the management system 12 to assume remote control of a managed system 18, and also to allow a remote solutions analyst associated with the management system 12 to communicate with and assist the user of the managed system 18 to address service requests pertaining to the managed system 18.

Following the setup of the initial service applications 40, the method 130 proceeds to decision block 160 where the managed system 18 is qualified, in the manner described above, to receive further services, as possibly specified by an information technology administrator. Should the relevant managed system 18 fail to qualify, at block 162, a solutions analyst at the management system 12 may again work with the user to resolve any issues.

FIG. 7B illustrates "Phase 2" of the method 130, according to the exemplary embodiment of the present invention. Specifically, following qualification of the managed system 18 at decision block 160, at block 200 the distribution application 46 is downloaded and installed on the managed system 18. At decision block 202, a determination is made as to whether an install of the virus application 48 has been requested (e.g., at block 86 of FIG. 5 by an information technology administrator). If so, at block 204, the installer application 45 removes existing anti-virus software that may have already been installed on the managed system 18, and downloads and installs the virus application 48.

At decision block 208, a determination is made as to whether a request has been made to install the backup application 49 on the managed system 18. If so, at block 210 the online backup application 49 is downloaded and installed on the managed system 18.

If it is determined at decision block 212 that the virus application 48 has been installed, the managed system 18 is restarted at block 214. At block 216, the install status is then displayed to the user, whereafter the method 130 terminates at block 218.

Administrator Impersonation

As described above with reference to decision block 154 of FIG. 7A, in one exemplary embodiment of the present invention, administrator rights may be required so as to enable the installer application 45 to setup and configure the managed system 18. It will be appreciated that the "impersonation" to obtain administration rights will, in one embodiment, only be performed at decision block 154 if a current login to the managed system 18 does not have such administrator rights. Furthermore, for certain managed systems 18, administrator rights may not be required. For example, on a personal computer running under Windows 98, such administrator rights are not required. In one embodiment, administrator impersonation is activated even though the current login may have administrator privileges.

Administrator impersonation is required, in one embodiment, so as to enable software distribution to the managed system 18 and the installation of a number of the service applications 40 (e.g., the virus application 48) on the managed system 18

Figure 12A:
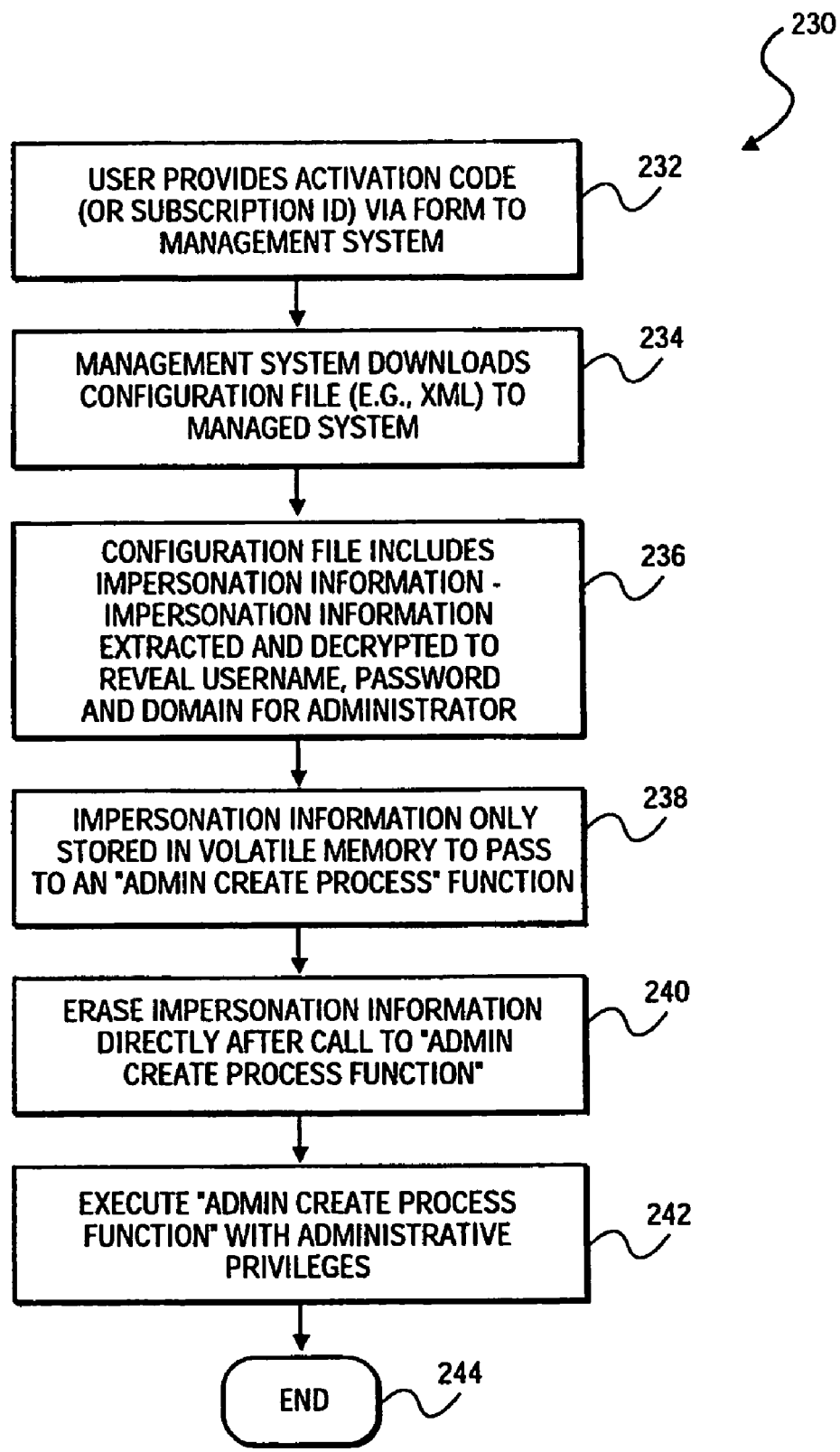
FIG. 12A is a flow chart illustrating a method, according to an exemplary embodiment of the present invention, of performing administrator impersonation on a managed system.

FIG. 12AA is a flow chart illustrating a method 230, according to an exemplary embodiment of the present invention, of performing administrator impersonation on a managed system 18.

As briefly eluded to above, in order to install application, modify the registry of a computer system, create certain services (e.g., Windows Link NT services, etc.), a user typically needs certain security privileges. Usually "administrator" user account and domain administrators have such security privileges. Regular (or restricted) users typically do not have administrative privileges on their systems. For example, users logged into their domain account typically cannot perform administrative tasks, such as installing programs.

For managed systems 18, where domain users are restricted from installing applications (e.g., on Windows NT/2000/XP), an information administrator is typically called upon to personally assist each user to install each new software. It will be appreciated that this places a large administrative burden on the IT administrator.

In one embodiment, the installer application 45 supports the above-mentioned administrator impersonation. Impersonation may, in one embodiment, be the ability to install and execute a program as a user that is different from a current logged in user. Accordingly, administrator impersonation enables the installation and execution of components (or applications) that would otherwise require administrator privileges.

Proceeding to the method 230 illustrated in FIG. 12A, the management system 12 creates the above-mentioned activation code, and specifies certain information to associate with the activation code. In one embodiment, the activation code may be a semi-random alpha-numeric string, somewhat akin to a license key. The activation code may identify the services to be installed on a managed system 18, or group of managed systems 18. The activation code also specifies whether administrator impersonation is to be utilized in the installation of such services, and a user name, a domain, and a password to be used for the administrator impersonation.

In one embodiment, if administrator impersonation is enabled, the control center 20 may prompt an IT administrator for an email address when the IT administrator provides the group and services input identifying services to be installed upon identified managed systems 18. Upon saving the activation code information at the management system 12, an email is sent to the administrator to request him/her to create a user account on a specified domain. This new user account is a domain administrator account, and is maintained within the data center 34 of the management system 12.

Depending upon the needs of an organization (e.g., an OEM or company), the management system 12 may utilize a single activation code for all installations associated with that organization, or utilize different activation codes for different components of the organization (e.g., different department, offices, levels of seniority within the organization, geographic locations (e.g., towns, states, countries, etc.)). For example, if an organization utilizes different Windows NT domains at different offices, each office may require a unique activation code with the applicable administrator impersonation account configured.

The method 230 commences at block 232 with a user of the managed system 18 providing the authentication code (or subscription identifier if the user is reinstalling the agent application 42) via a form to the management system 12. The management system 12 utilizes the inputted activation code to identify the user's account in order to prevent (or limit) unauthorized downloads and installs of software. At the management system 12, each unique activation code has information associated therewith, such as for example:

1) The scrambled user name, domain and password (impersonation data) to be utilized for administrator impersonation;
2) A list of services to be installed on a managed system, or systems, 18 (e.g., start menu, shortcuts, desk side assistance, software management agents, etc.); and
3) Branding information (e.g., the company name, support telephone no., copyright information, etc.).

Figure 12B:
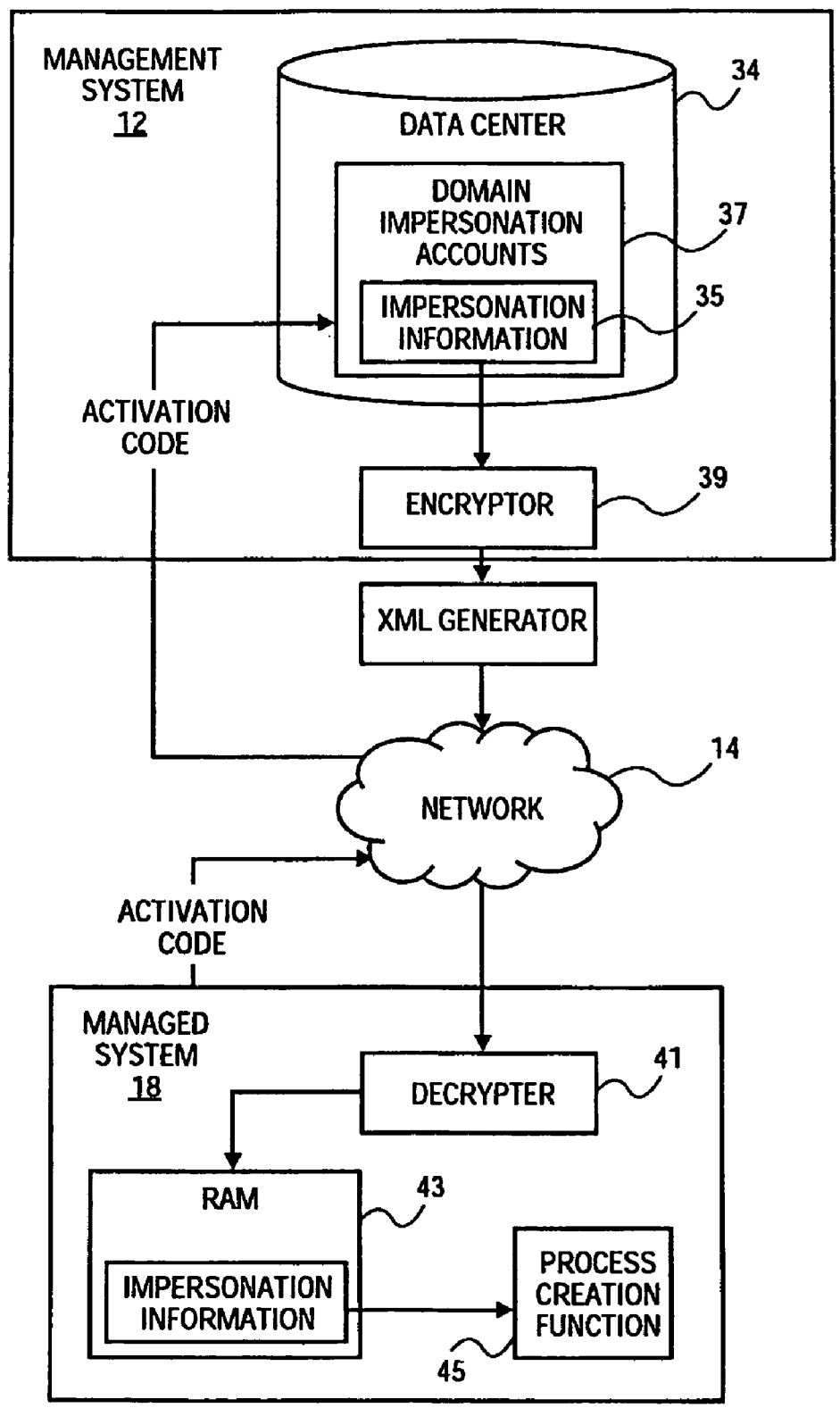
FIG. 12B is a block diagram illustrating how an activation code may, in an exemplary embodiment, be utilized to identify impersonation information stored within a domain impersonation account within the data center.

When the user provides the activation code to management system 12 to effectively "log on", the activation code is verified against information stored within the data center 34 and a configuration file is composed based on information (e.g., the above-identified information) associated with the relevant activation code. Specifically, as illustrated in FIG. 12B of the activation code may be utilized to identify impersonation information 35 stored within a domain impersonation account 37 within the data center 34. The identify impersonation information 35 may then be extracted from the data center 34, and included within the configuration file composed by the configurator 32 of the management system 12. In one embodiment, at the impersonation information 35 is encrypted by an encryptor 29 deployed at the management system 12 before being included within the configuration file. The composed configuration file is then presented for download to the managed system 18.

At block 234, the management system 12 downloads the configuration file (e.g., an XML configuration file) to the managed system 18 using, for example, HTTPS. The configuration file includes the impersonation information that the agent application 42 is able to utilize to perform administrator impersonation to obtain administrator privileges. At block 236, this impersonation information is extracted from the configuration file, and decrypted by a decryptor 41 that may be a component of the agent application 42. In one embodiment, the impersonation information includes a user name, password and domain for an administrator that is revealed by the decryption process.

At block 238, and as illustrated in FIG. 12B, this impersonation information is stored temporarily in volatile memory (e.g., Random Access Memory (RAM) 43) so as to enable this impersonation information to be communicated to a process creation function 45 that has administrative authorization. Specifically, in one embodiment, at block 238 a call (e.g., a Wireless API call) is made to the process creation function 45 utilizing the impersonation information.

At block 240, the impersonation information is erased from the volatile memory directly after the call has been made to the process creation function 45.

At block 242, the process creation function 45 is executed to setup and configure the managed system 18. In one embodiment, the process creation function creates a new process that will run with the privileges of the domain impersonated administrator account. Further, any processes that are spawned from the newly created process will inherit the same administrator privileges.

The method 230 then ends at block 244. It should also be noted that, in one embodiment, the configuration file that includes the impersonation information is received at the managed system 18 from the management system 12 utilizing HTTPS, and the configuration file itself is stored on a non-volatile storage medium (e.g., a disk).

By only revealing the impersonation information for a very short time, and within a volatile memory, the present invention seeks to limit the probability of a user obtaining access to this impersonation information and thus being able to perform operations with respect to the managed system 18 for which they are not authorized.

Customization

As also discussed above with reference to block 144 of FIG. 7A, the configuration file downloaded from the management system 12 to the managed system 18 may include customization information, in the exemplary form of branding information, that allows the registration form 54, and other user interfaces presented by the agent application 42, to be customized according to the requirements of a specific organization and that also allows, for example, organization-specific information and choices to be presented to a user of a managed system 18. The organization may, for example, be a user organization that uses the managed system 18, a service organization (e.g., McAfee.com) that provides one or more of services to the managed system 18, a management organization (e.g., Everdream Corporation) that manages the supply of services from multiple service providers to the managed system 18, or a supplier organization (e.g., an OEM such as Hewlett-Packard) that supplies the managed system 18 to a user organization. In one embodiment, branding for the agent application 42 is based on the activation code entered at decision block 136 of FIG. 7A by the user. Customization information in the form of branding elements to be used by the agent application 42 may be dynamically determined based on information included in the configuration file that downloads from the management system 12 to the managed system 18 at block 144, based on a supplied activation code. Any table of exemplary customization information is set out below:

|   |
|---|
| Company/OEM Name |
| Support Phone |
| Window Title |
| Introduction Page |
| Icons |
| Text Messages |
| Dialog Boxes |
| URL's |
| Bitmaps |
| Copyright Information |
| Read Me file |
| Help Website |
| Graphic Elements |

A variety of interfaces generated by the agent application 42 may be branded with any one or more of the above identified evidence of the customization information. For example, both graphic and textural information may be included within the customization information.

The customization information be composed at the management system 12, or may be uploaded to the management system 12 from the representative of an organization (e.g., the information technology administrator). The customization information is, in one embodiment, then downloaded to the agent application 42 executing on the managed system 18 as part of the configuration file. Of course, in an alternative embodiment, where the distribution of the agent application 42 is via a physical storage medium (e.g., a CD), the customization information may be included within the configuration file stored on the storage medium.

An exemplary XML configuration file is provided below.

```
<?xml version="1.0"?>
<direct_config brand="ACME BICYCLE">
<! - -the user element is only delivered if a valid subscription number is sent-->
<user first_name="Gert" last_name+"Japie"
email="japie@koeksister.com" phone=:343433" ext="3434"
question="what type of car do I drive" office_id="1-GH31"
address_id="341"/>
<offices>
<office id="1-GH31" name="Town and Country Ford">
    <address id="344">
    6591 Dumbarton Circle, Freemont
    </address>
```

-continued

```
    <address id="345">
    456 DNA Way, Charlotte
    </address>
</office>
<office id="1-GH31" name="Sunnyvale Volvo">
    <address id="341">
    6591 Dumbarton Circle, Fremont
    </address>
    <address id="340">
    456 DNA Way, Charlotte
    </address>
</office>
</offices>
<branding>
<image name="top_left" url="http://images.acme.com/logo.gif"/>
<label name="company_name " value="acme"/>
<label name="support_phone" value="1-877-45644"/>
<license>
Please agree to the following terms and conditions...
</license>
</branding>
<system>
<install exe="MASetup.exe" auth="343ASDF"/>
<service name="OLB"/>
<service name="NAV"/>
<! - - package element is only present in cd insta;; - - >
<package name="CD_Install.pkg"/>
</system>
</direct_config>
```

Figure 13:
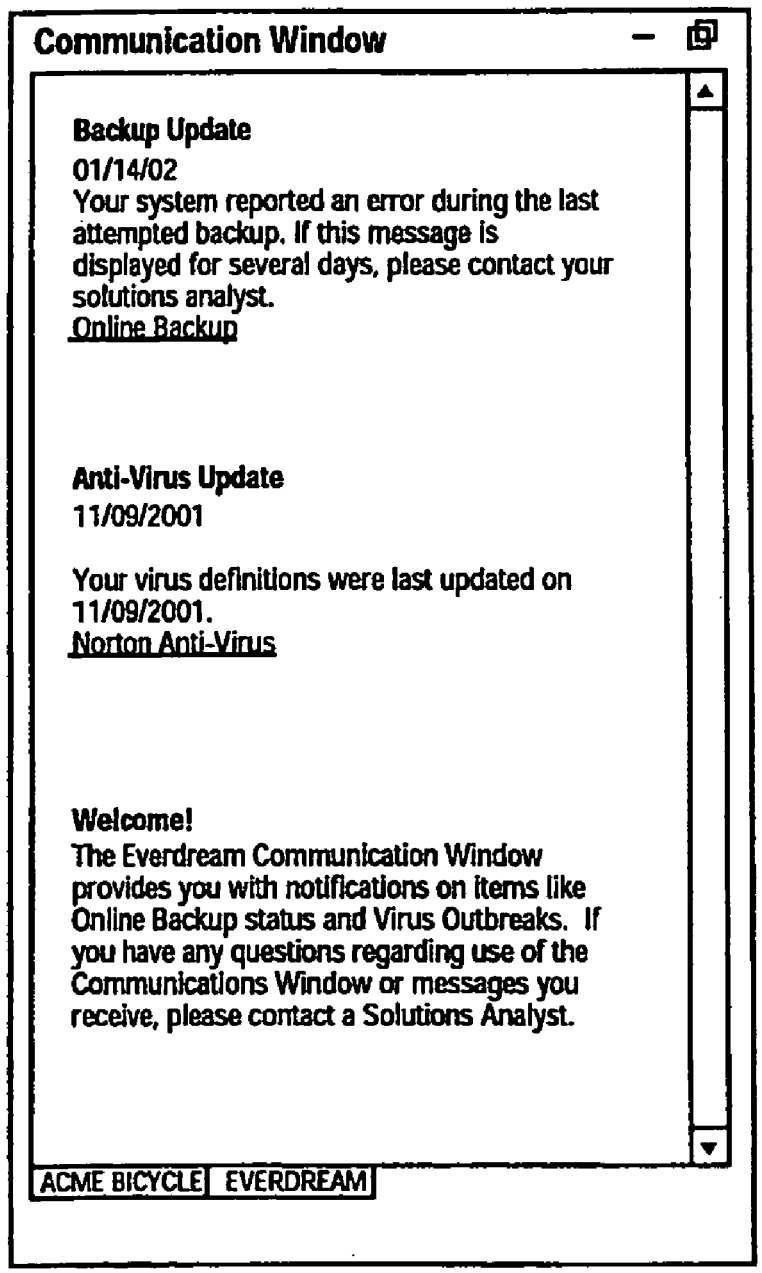
FIG. 13 illustrates an exemplary communication window, which has been branded utilizing branding elements contained in a configuration file.

It will be noted that the above XML configuration file includes "branding" tags that delimit exemplary customization information. In one embodiment, the agent application 42 operates to present a communication interface to users of a managed system 18 on a periodic basis, the communication window providing information to the user regarding service operations that may have been performed pertaining to the managed system 18. FIG. 13 illustrates such an exemplary communication interface in the form of a communication window 180, which has been branded utilizing the customization information contained in a configuration file.

FIG. 1 illustrates the inventory application 44 as storing asset, user and branding information within the registry 56. In an alternative embodiment of the present invention, it is not assumed that the necessary privileges exist to write to the registry 56. Accordingly, all information and configuration settings may be stored within an initialization file (e.g., an .ini file) on a storage medium (e.g., a hard disk) of the managed system 18. Information stored within this initialization file may also be stored within the CRM database 70 of the management system 12. In one embodiment, the file (or files) stored on the managed system 18 may include an asset information section and a customization (e.g., branding) section. Examples of the asset information section and the customization section are provided in the tables shown immediately below:

| Name | Sample Value | Description | Source |
|---|---|---|---|
| AccountName | Bovis Construction | The name of the account | \<label name = "company_name" value = "Acme"/> |
| Address | 6591 Dumbarton Circle | The string of the user's selected office address. | \<address id = "345">456 DNA Way, |

-continued

| Name | Sample Value | Description | Source |
|---|---|---|---|
| | | | Charlotte</address> and/or <user address_id = "123" . . . /> if a returning user. |
| AddressId | 134 | The control center contact ID of the user's office location | Same as Address |
| CDVersion | Bovis-2.0.1 | Empty if it's not a CD install | DirectForm.ini |
| City | Fremont | | Same as Address |
| Company | Acme | | Same as Address |
| Email | gert@acme.com | | <user email = "test" . . . /> or user enters it. |
| FirstName | Gert | User's First Name | <user first_name = "Gert" . . . /> or user enters it. |
| MiddleName | A | User's Middle Name | <user middle_name = "A" . . . /> or user enters it. |
| LastName | Lombard | User's Last Name | <user last_name = "Lombard" . . . /> or user enters it. |
| InstallSoftware | VDSA OLB AB | Any combination of services (software options): CW Communications Window VDSA - virtual desk-side assistance OLB - Online Backup AV - Anti-virus Dial - Internet Dialer We get this from the XML data from Login.asp. | <service name = "OLB"/> <service name = "NAV"/> |
| OfficeId | 83 | The Control Center office ID of the user's selected office. | |
| Phone | (510) 818-5500 | | <user phone = "123" ext = "3434" . . . /> or user enters it. |
| Recovery | 1 | | DirectForm.ini |
| State | CA | Saved only for completeness | Derived from selected address. |
| SubscriptionId | 364323 | | |
| Version | 2.0.1 | | DirectForm.ini |
| ZipCode | 94536 | | Derived from selected address |
| AccountName | Everdream | The Siebel root account name | <label name = " company_name" value = "Acme" |
| BrandingId | Everdream | Currently Everdream or ITReady. Used by DirectInstall to brand the HTML templates. Also used by the MA package to decide which OL to use. | <direct_config brand = "acme"> |

-continued

| Name | Sample Value | Description | Source |
|---|---|---|---|
| SupportPhone | 1-877-4DREAM4 | Company's Support number | \<label name = "support_phone" value = "1-877-4373264 |
| PackageFileName | D:\data\1.pkg | Used by DirectInstall for CD/CDK installs. | \<package name = "CD_Install.pkg"/> |

Control Center

Figure 14:
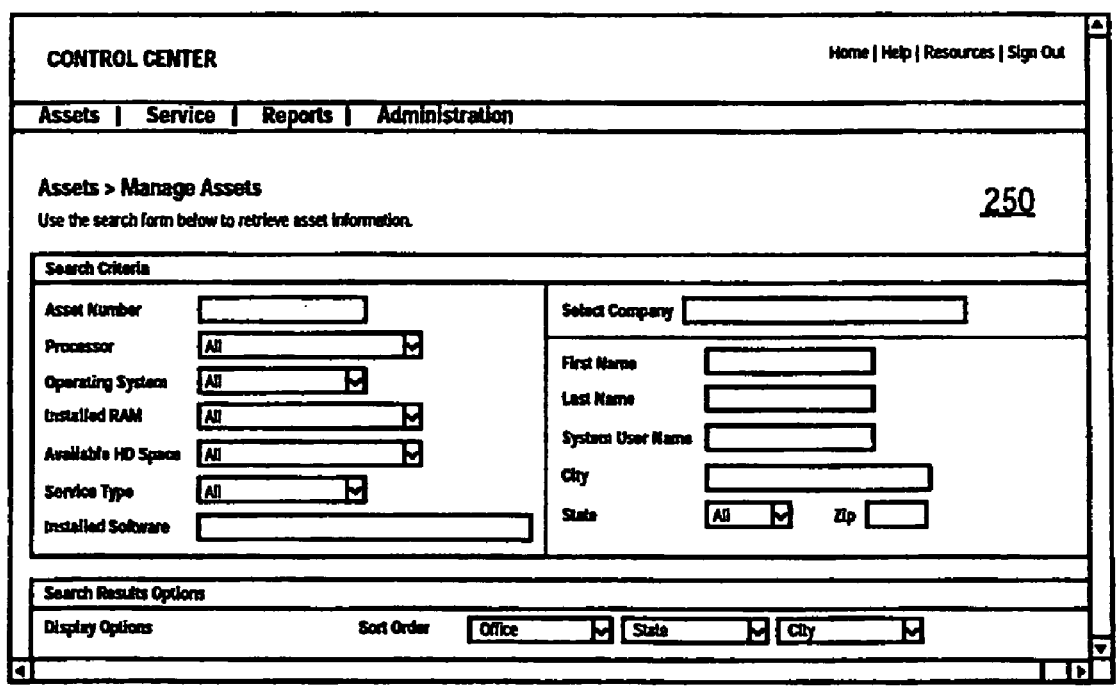
FIG. 14 illustrates an asset management search interface, according to an exemplary embodiment of the present invention, which may be generated by the assets application of the control center.

As described above, the control center 20 in one exemplary embodiment allows an IT administrator to specify, configure and view services that are delivered to multiple managed system 18. These multiple managed systems 18 may at the located at a single location, or may be distributed across a number of locations. To this end, the control center 20 may be Web-based and provide a number of real-time interfaces to services hosted and/or managed by the management system 12. An IT administrator, for example, can log into the control center 20 to access valuable information and reports regarding a number of managed systems 18 that are potentially distributed across the number of locations. In one embodiment, the control center 20 includes a number of applications, namely an assets application, a services application, a reports application and an administration application. These applications are described in further detail below with respect to user interfaces that may be presented to an IT administrator. Each of the applications operates to present FIG. 14 illustrates an asset management search interface 250, according to an exemplary embodiment of the present invention, which may be generated by the assets application of the control center 20. Specifically, the asset management search interface 250 enables an IT administrator to enter search criteria for a report back on all managed systems 18 associated with an account, or a subset of managed systems 18 identified according to the input search criteria. For example, an IT administrator may request the control center 20 to return an asset management report identifying all managed systems 18 associated with an organization that have a particular process, operating system, installed RAM size, available hard drive space, service type and/or installed software. The IT administrator may request asset information regarding a managed system 18 associated with a specific user identified, for example, by first name, last name, or geographic location. The asset management search interface 250 also enables the IT administrator to sort line items returned in an asset management search report according to any one of multiple criteria.

Figures 15, 16:
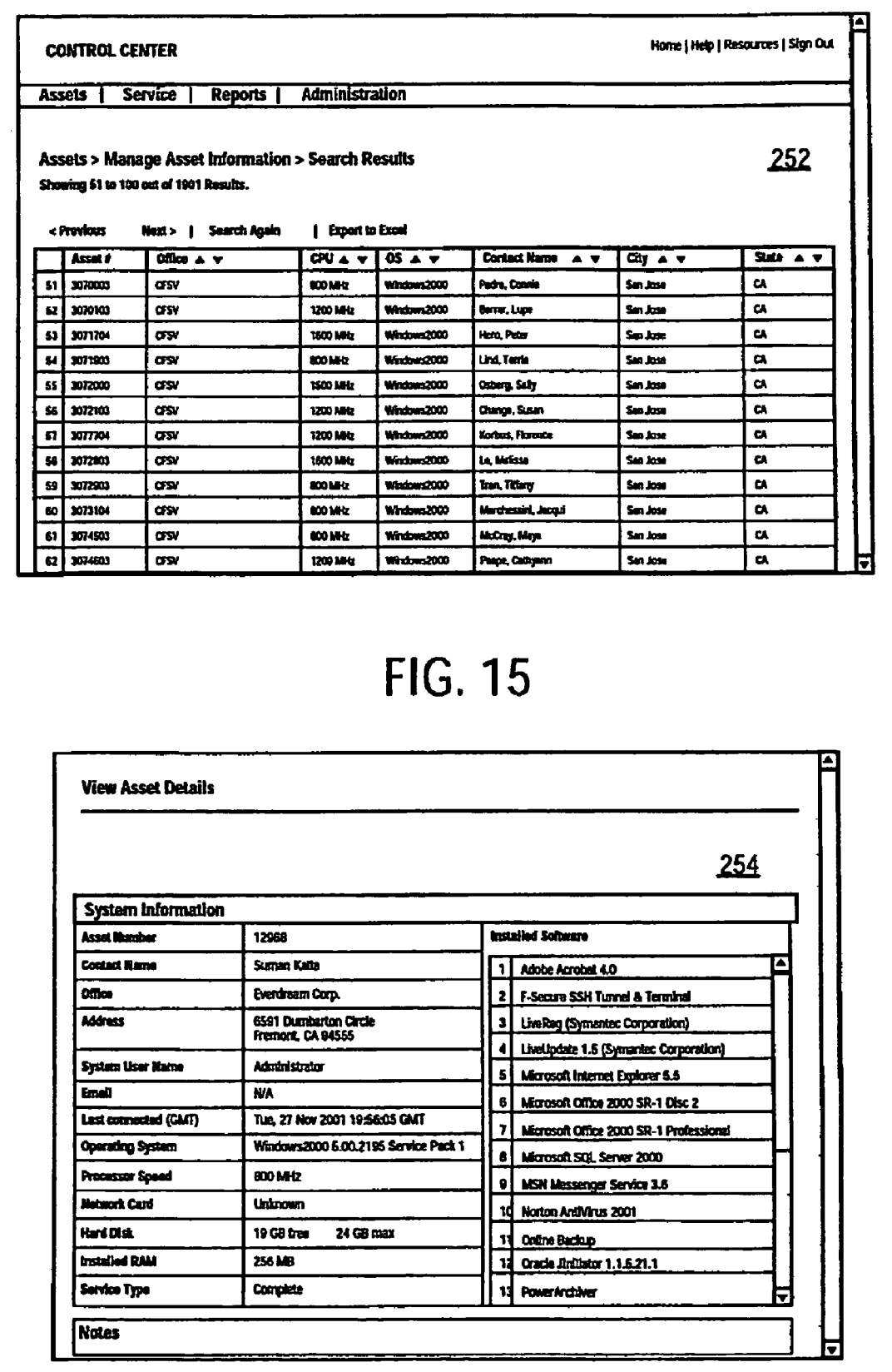

FIG. 15 illustrates asset management report interface 252, according to an exemplary embodiment of the present invention, which may be returned responsive to search criteria inputted into the search interface 250. The exemplary report interface 252 is shown to present a report including a list of all assets that match the specified search criteria. The report shown within the report interface 252 may, for example, display line items for specific managed systems 18 that have a specified software installation, or that do not meet minimum hardware requirements for a planned software rollout.

FIG. 16 illustrates an assets details interface 254, according to an exemplary embodiment of the present invention, which may be generated by the assets application of the control center 20. Specifically, the assets details interface 254 is shown to provide detailed information regarding the hardware and software assets of a managed system 18, and also regarding the services that are delivered to the specific managed system 18. The asset details interface 254 may be generated, for example, by user selection of a hypertext link for the relevant managed system 18 included within the report interface 252.

Figures 17, 18:
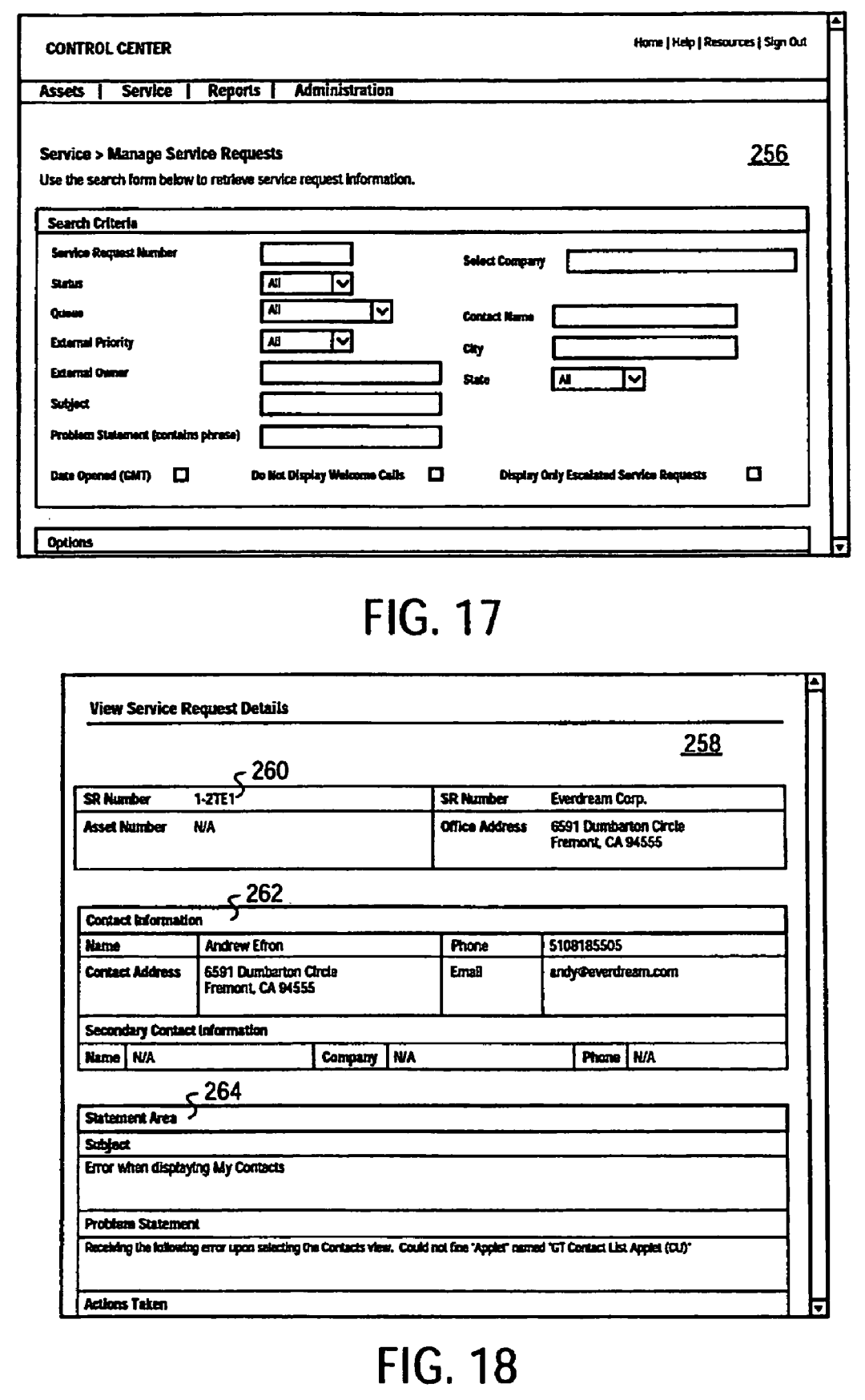

FIG. 17 illustrates a service request interface 256, according to an exemplary embodiment of the present invention, which may be generated by the services application of the control center 20. The services application allows an IT administrator, for example, to view, edit, and create "trouble tickets" (or service requests) pertaining to a specific managed system 18 or group of managed systems 18. The exemplary service request interface 256 shown in FIG. 17 allows an IT administrator to retrieve service request information utilizing search criteria.

FIG. 18 illustrates a service request details interface 258, according to an exemplary embodiment of the present invention, which again may be generated by the services application of the control center 20. The service request details interface 258 provides detailed information regarding a service request issued to the management system 12 (e.g., by the IT administrator or by a user of the managed system 18). The service request details interface 258 also lists resolution actions taken to resolve the service request. To this end, the interface 258 identifies a service request number 260, contact information 262 regarding a user of a managed system 18, and a statement area 264 that provides descriptions of the service request, and provides a list of actions taken by the management system 12 to resolve the service request. Such actions may, for example, be undertaken by a technical support analyst that obtains desk-side assistance of the managed system 18 utilizing the desk-side assistance application 47, or that are undertaken by a user of the managed system 18 under direction of a technical support specialist. The details interface 258, it will be appreciated, provides an IT administrator with a convenient manner of monitoring the status of outstanding and unresolved service requests across multiple managed systems 18 associated with an organization.

The reporting application of the control center 20 allows an IT administrator to run near real-time reports across multiple managed systems 18. In one embodiment, such managed systems 18 do not need to be connected to the management system 12 as all information necessary to write the relevant reports may be cached in the main database 68 of the management system 12. The various reports described herein may be generated by issuing, for example, SQL statements that perform searches of the tables 66 within the main database 68. As described above, the tables 66 are updated periodically by components of the agent application 42 (e.g., the setup executable 50 and registration form 54) hosted on each managed system 18, as well as by the administration console 72 that supports the control center 20. FIG. 3 illustrates how various applications and applications update the tables 66.

Figure 19:
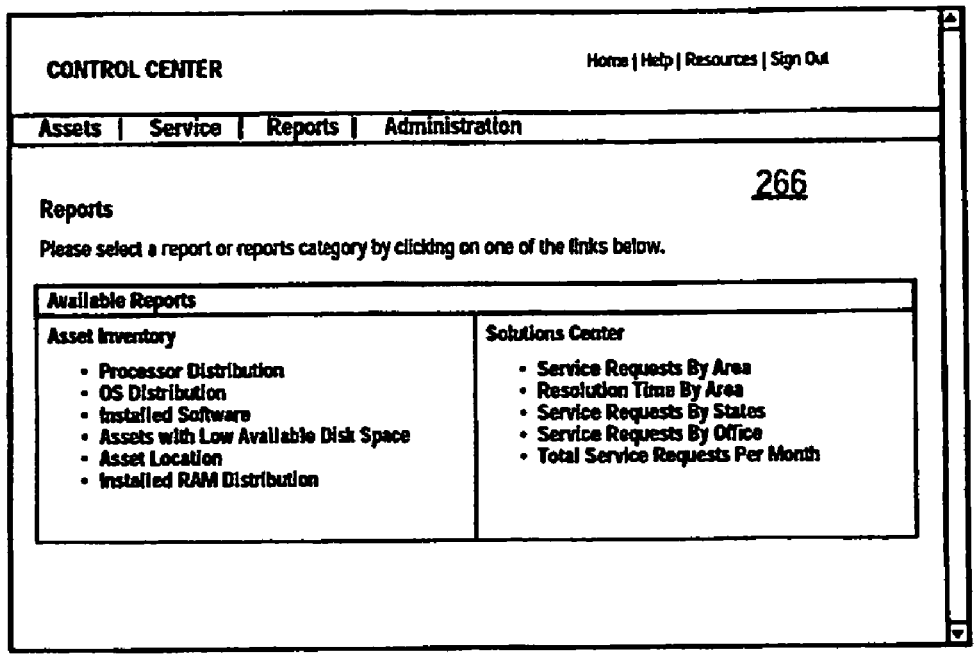
FIG. 19 illustrates a report interface, according to an exemplary embodiment of the present invention, which allows an IT administrator to select one or reports from a list of available reports.

FIG. 19 illustrates a report interface 266, according to an exemplary embodiment of the present invention, which allows an IT administrator to select one or reports from a list of available reports. Exemplary report types are shown within the report interface 266.

Figure 20:
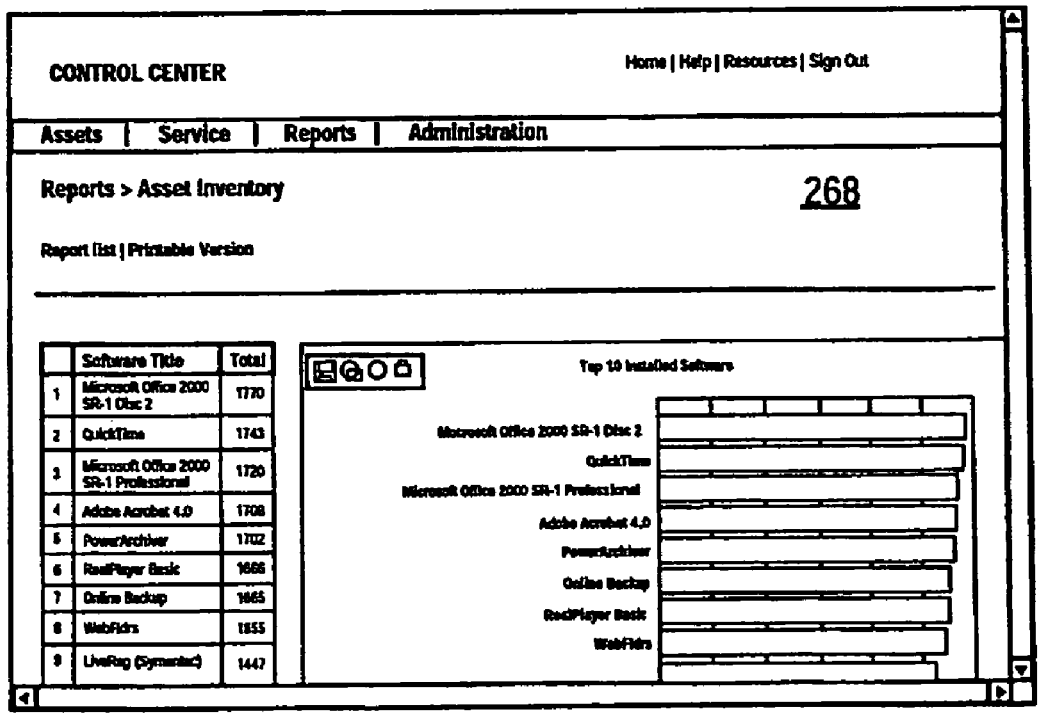
FIG. 20 illustrates an exemplary software license report interface that provides installation totals for each of multiple software applications (or packages) across multiple managed systems 18.

FIG. 20 illustrates an exemplary software license report interface 268 that provides installation totals for each of multiple software applications (or packages) across multiple managed systems 18. For example, the interface 268 indicates that Microsoft Office 2000 is installed on 1770 managed systems 18 across an organization. The interface 268 also provides a list of "top ten" installed software applications (or packages). The software license report interface 268 is very useful to an IT administrator for monitoring license compliance.

In one embodiment of the present invention, the management system 12 may assume responsibility for software license compliance on behalf of an organization. Specifically, responsive to a request from an IT administrator to download and install a specific application (e.g., a word processor application) on a managed system 18, the management system 12 may operate to procure the appropriate license on behalf of the organization, and then to update an account maintained by the management system 12 on behalf of the organization to reflect the appropriate license fees (e.g., a one time license fee, or a periodic license fee that is invoiced to the organization on a recurring basis).

The management system 12 may also track license compliance for applications self-licensed and installed by an organization that utilizes a managed system 18. In this case, the management system 12 will not assume responsibility for license compliance for those applications that are licensed and installed by the organization on the managed system 18. However, the management system 12 may nonetheless report on the state of compliance by the organization with its license obligations relating to such self-licensed applications installed on a number of managed systems 18.

Figure 21:
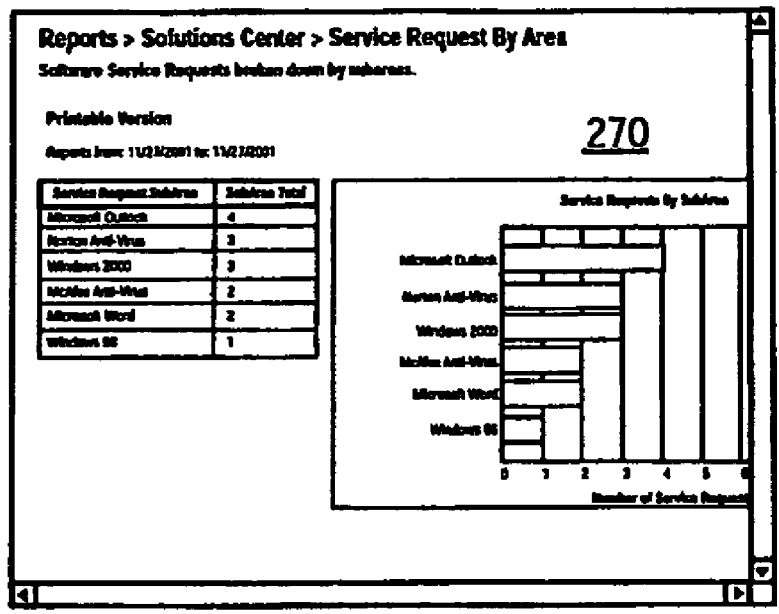
FIGS. 21 and 22 illustrate further exemplary report interfaces including a "service request by area" interface that provides a break down of the number of service requests received by the management system from managed system of an organization pertaining to specific software application within predetermined time periods.
Figure 22:
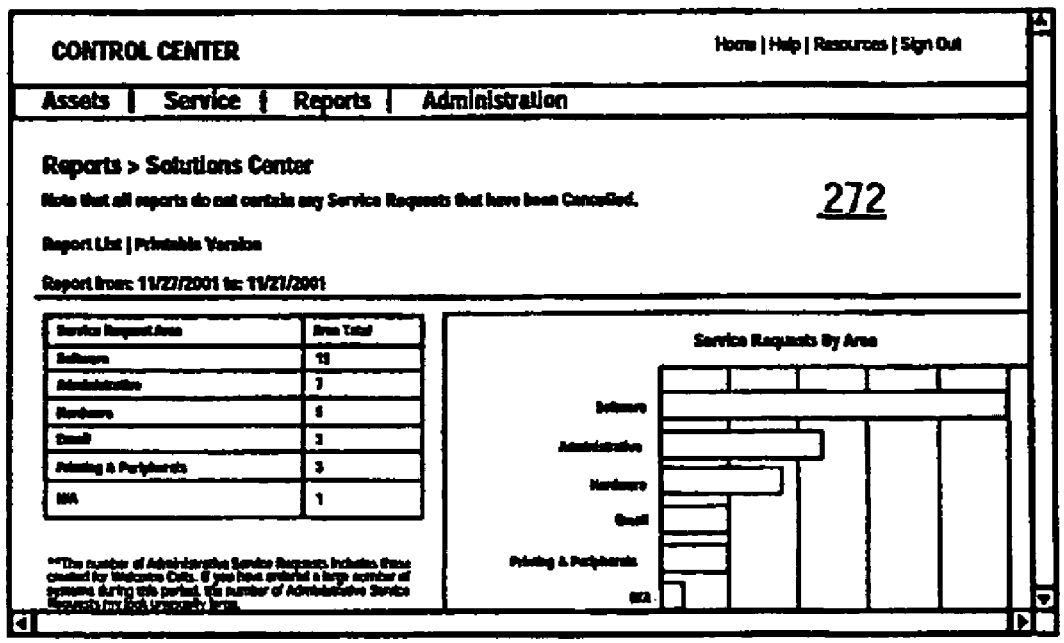

FIGS. 21 and 22 illustrate further exemplary report interfaces 270 and 272. Specifically, the "service request by area" interface 270 provides a break down of the number of service requests received by the management system 12 from managed system 18 of an organization pertaining to specific software application within predetermined time periods. FIG. 22 illustrates a report 272 that provides a break down of service requests according to a service request "area" (e.g., software, hardware, administrative, email, printers and peripherals, etc.).

Numerous other reports that provide aggregate information regarding assets, services and/or service requests pertaining to managed systems 18 of an organization may be generated by the reports application of the control center 20. These reports are useful to an IT administrator a number of ways, and enable the IT administrator to manage systems 18 of an organization in an efficient manner.

Computer System

Figure 23:
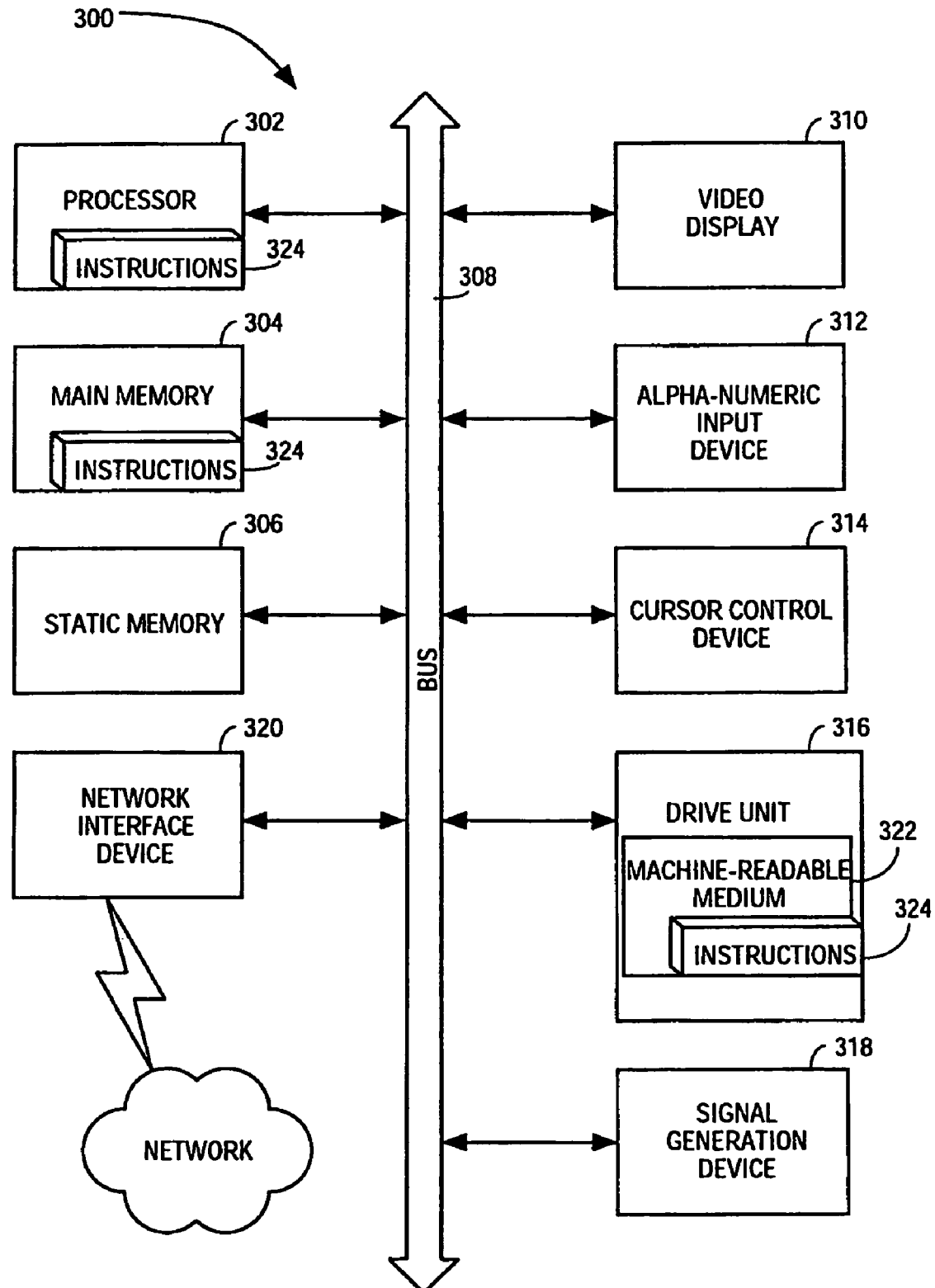
FIG. 23 shows a diagrammatic representation of machine in the exemplary form of a computer system within which a set of instructions, for causing the machine to perform any part of one or more of the methodologies discussed above, may be executed.

FIG. 23 shows a diagrammatic representation of machine in the exemplary form of a computer system 300 within which a set of instructions, for causing the machine to perform any part of one or more of the methodologies discussed above, may be executed. In alternative embodiments, the machine may comprise a network router, a network switch, a network bridge, a set-top box (STB), Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored a set of instructions (i.e., software) 324 embodying any one, or all or part, of the methodologies or functions described herein. The software 324 is also shown to reside, completely or at least partially, within the main memory 304 and/or within the processor 302. The software 324 may further be transmitted or received via the network interface device 320. For the purposes of this specification, the term "machine-readable medium" shall be taken to include any medium that is capable of storing, encoding or carrying a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system for managing services for a managed computer system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to facilitate provision of services to a managed system, the method comprising:
   causing installation of an agent application on the managed system, the agent application including an inventory component;
   at a management system, receiving a service input from a control center, the service input identifying a service application to be installed on the managed system, the service application to facilitate a provision of a respective service provided by a respective service provider to the managed system;
   at the management system, receiving inventory information pertaining to the managed system from the inventory component of the agent application;
   storing the inventory information in a database associated with the management system, the database including inventory information pertaining to a plurality of managed systems;
   at the management system, using the inventory information, determining whether the managed system is qualified to receive the provision of the respective service facilitated by the service application; and
   at the management system, upon qualification of the managed system, providing the respective service facilitated by the service application to the managed system.

2. The method of claim 1, comprising, upon qualification of the managed system, communicating a subscription identifier to the agent application.

3. The method of claim 1, wherein the agent application comprises an install component, the method further comprising:
   after the managed system is qualified to receive the provision of the respective service facilitated by the service application, distributing the service application to the install component of the agent application, the install component to install the service application on the managed system.

4. The method of claim 1, wherein determining whether the managed system is qualified to receive the provision of the respective service comprises:
   receiving a user activation code from the managed system; and executing a qualification algorithm using the user activation code to identify the respective service that the managed system is qualified to receive.

5. The method of claim 1, wherein the inventory information comprises at least one of software inventory information, hardware inventory information and services inventory information, the software inventory information identifying software installed on the managed system, the hardware inventory information identifying hardware components of the managed system and the service inventory information identifying services provided to the managed system.

6. The method of claim 1, comprising:
presenting the inventory information regarding the managed system to an administrator.

7. The method of claim 1, comprising:
retrieving the inventory information directly from the plurality of managed systems responsive to a request from the administrator;
aggregating the inventory information to provide aggregated inventory information; and
generating and presenting to the administrator an aggregate report based on the aggregated inventory information.

8. The method of claim 1, further comprising:
receiving a group input from an administrator identifying a plurality of managed systems on which the service application is to be installed, and distributing the service application to each of the plurality of managed systems for installation by a respective agent application on each of the plurality of managed systems.

9. The method of claim 8, wherein a control application of the management system receives the service and group inputs and communicates the service and group inputs to a distribution engine, and wherein the distribution engine operates to distribute service applications to the plurality of managed systems in accordance with the service and group inputs.

10. The method of claim 9, wherein each of the plurality of managed systems is identified by the control application utilizing a respective subscription identifier.

11. The method of claim 1, further comprising:
updating an account associated with the managed system to reflect the distribution of the service application to the managed system, wherein the account is associated with a plurality of managed systems managed by an administrator.

12. The method of claim 1, wherein the respective service comprises at least one of a desk-side assistance service, a data backup service, a virus protection service, an asset inventory service, a network access service, a help desk service, an Internet messaging service, a personal firewall, or a software distribution service.

13. A management system to facilitate provision of services to a managed system, the management system comprising:
at least one processor;
memory in communication with the at least one processor, the memory being configured to store instructions executable by the processor and including;
a distribution engine to cause installation, on the managed system, of an agent application including an inventory component;
a control component to receive a service input identifying a service application to be installed on the managed system, the service application to facilitate a provision of a respective service provided by a service provider to the managed system;
an inventory engine to receive inventory information, pertaining to the managed system, from the inventory component of the agent application and to store the inventory information in a database associated with the management system, the database including inventory information pertaining to a plurality of managed systems; and
a qualification component configured to use the inventory information to determine whether the managed system is qualified to receive the provision of the respective service facilitated by the service application, wherein, upon qualification, the service facilitated by the service application is provided to the managed system.

14. The system of claim 13, wherein, upon qualification, a subscription identifier is communicated to the agent application.

15. The system of claim 13, wherein the agent application further includes an install component and, after the managed system is determined to be qualified to receive the provision of the respective service facilitated by the service application, the service application is distributed to the install component of the agent application, the install component being configured to install the service application on the managed system.

16. The system of claim 13, wherein the qualification component is configured to receive a user activation code from the managed system, and execute a qualification algorithm using the user activation code to identify the respective service that the managed system is qualified to receive.

17. The system of claim 13, comprising a control center to present the inventory information to an administrator.

18. The system of claim 13, wherein the control component is to:
retrieve the inventory information directly from the plurality of managed systems responsive to a request from the administrator;
aggregate the inventory information to provide aggregated inventory information; and
generate and present to the administrator an aggregate report based on the aggregated inventory information.

19. The system of claim 13, wherein the control component is to receive a group input from an administrator identifying a plurality of managed systems on which the service application is to be installed, and the distribution engine is to distribute the service application to at least one of the plurality of managed systems for installation by a respective agent application on the at least one of the plurality of managed systems.

20. The system of claim 19, comprising a subscription component to update an account associated with the managed system to reflect the distribution of the service application to the managed system, wherein the account is associated with a plurality of managed systems managed by an administrator.

21. A non-transitory computer-readable storage medium storing a sequence of instructions that, when executed by a computer, cause the computer to perform following operations:
installing an agent application on a managed system, the agent application including an inventory component;
receiving, at a management system, a service input from a control center, the service input identifying a service application to be installed on the managed system, the service application to facilitate a provision of a service provided by a respective service provider to the managed system;
receiving, at the management system, inventory information pertaining to the managed system from the inventory component of the agent application;
using, at the management system, the inventory information to determine whether the managed system is qualified to receive the provision of the respective service facilitated by the service application;

storing, at the management system, the inventory information in a database associated with the management system, the database including inventory information pertaining to a plurality of managed systems; and providing upon qualification, at the management system, the service facilitated by the service application.

\* \* \* \* \*

UNITED STATES PATENT AND TRADEMARK OFFICE
CERTIFICATE OF CORRECTION

PATENT NO. : 7,779,092 B2
APPLICATION NO. : 12/193272
DATED : August 17, 2010
INVENTOR(S) : Russell Rive et al.

It is certified that error appears in the above-identified patent and that said Letters Patent is hereby corrected as shown below:

On page 2, in column 2, under "Other Publications", line 9, delete "opionion" and insert -- opinion --, therefor.

In column 1, line 4, below "Title" insert -- RELATED APPLICATION --.

In column 2, line 36, after "site" insert -- . --.

In column 4, line 35, after "system." delete "Service and warranty information outlines asset entitlements and service history. This information, in one embodiment, may be stored within the context of the support systems 24 and updated via the control center 20." and insert the same on Col. 4 Line 36 as the new paragraph.

In column 16, line 46, after "system 18" insert -- . --.

In column 16, line 47, delete "12AA" and insert -- 12A --, therefor.

In column 18, line 13, delete "decryptor" and insert -- decrypter --, therefor.

In column 23, line 6, after "877-4373264" insert -- " --.

In column 23, line 31, after "present" insert -- . --.

In column 28, line 49, in Claim 21, delete "non-transitory" and insert -- non transitory --, therefor.

Signed and Sealed this

Sixteenth Day of November, 2010

David J. Kappos
*Director of the United States Patent and Trademark Office*